United States Patent [19]

Hoelscher et al.

[11] Patent Number: 5,049,754

[45] Date of Patent: Sep. 17, 1991

[54] RADIATION DOSIMETER DISASSEMBLY, ASSEMBLY AND READING APPARATUSES AND METHODS

[75] Inventors: James W. Hoelscher, Pullman, Wash.; Carl D. Bloomsburg, Moscow, Id.

[73] Assignee: International Sensor Technology, Inc., Pullman, Wash.

[21] Appl. No.: 371,555

[22] Filed: Jun. 26, 1989

Related U.S. Application Data

[63] Continuation-in-part of Ser. No. 343,000, Apr. 24, 1989.

[51] Int. Cl.[5] .......................... G01T 1/02; G01T 1/10
[52] U.S. Cl. ........................ 250/484.1; 250/482.1; 250/486.1; 250/337
[58] Field of Search ............... 250/484.1 A, 484.1 C, 250/337, 482.1, 486.1, 475.2

[56] References Cited

U.S. PATENT DOCUMENTS 4,465,936 8/1984 Ishiguro et al. .................. 250/486.1

Primary Examiner—Carolyn E. Fields
Attorney, Agent, or Firm—Wells, St. John & Roberts

[57] ABSTRACT

Disclosed is a radiation dosimeter reading apparatus designed to disassemble, reposition, read, and reasemble radiation dosimeter badges. The dosimeter reading apparatus includes a dosimeter badge chuck assembly which engages a dosimeter badge in an infeed dosimeter badge holder. The chuck assembly engages the dosimeter badge using a set of tamper element prongs which depress a tamper ring which forms part of the dosimeter badge. The depression of the badge tamper ring releases a locking ring which also forms part of the dosimeter badge. Once the locking ring is freed, then another set of prongs on the chuck assembly are rotated to route the locking ring of the badge and thereby release a disk-shaped dosimeter badge insert. The chuck assembly is further adapted to grasp the released insert by contracting the tamper element prongs inwardly against the perphery of the disk-shaped insert to hold the inset on the chuck assembly. The chuck assembly then is carried with the removed badge insert on a chuck positioning mechanism which places inside of the dosimeter insert adjacent to a laser reading arrangement which stimulates the dosimeters with a laser beam and measures the amount of luminescent energy stored in the dosimeters held on the badge. After reading the badge is reassembled by inserting the disk-shaped badge insert into the remaining portions of the dosimeter badge and rotating the locking ring with the chuck assembly locking prongs thereby sealing the insert and badge case together. The invention also includes methods for assembly, disassembly and reading of dosimeter badges.

55 Claims, 18 Drawing Sheets

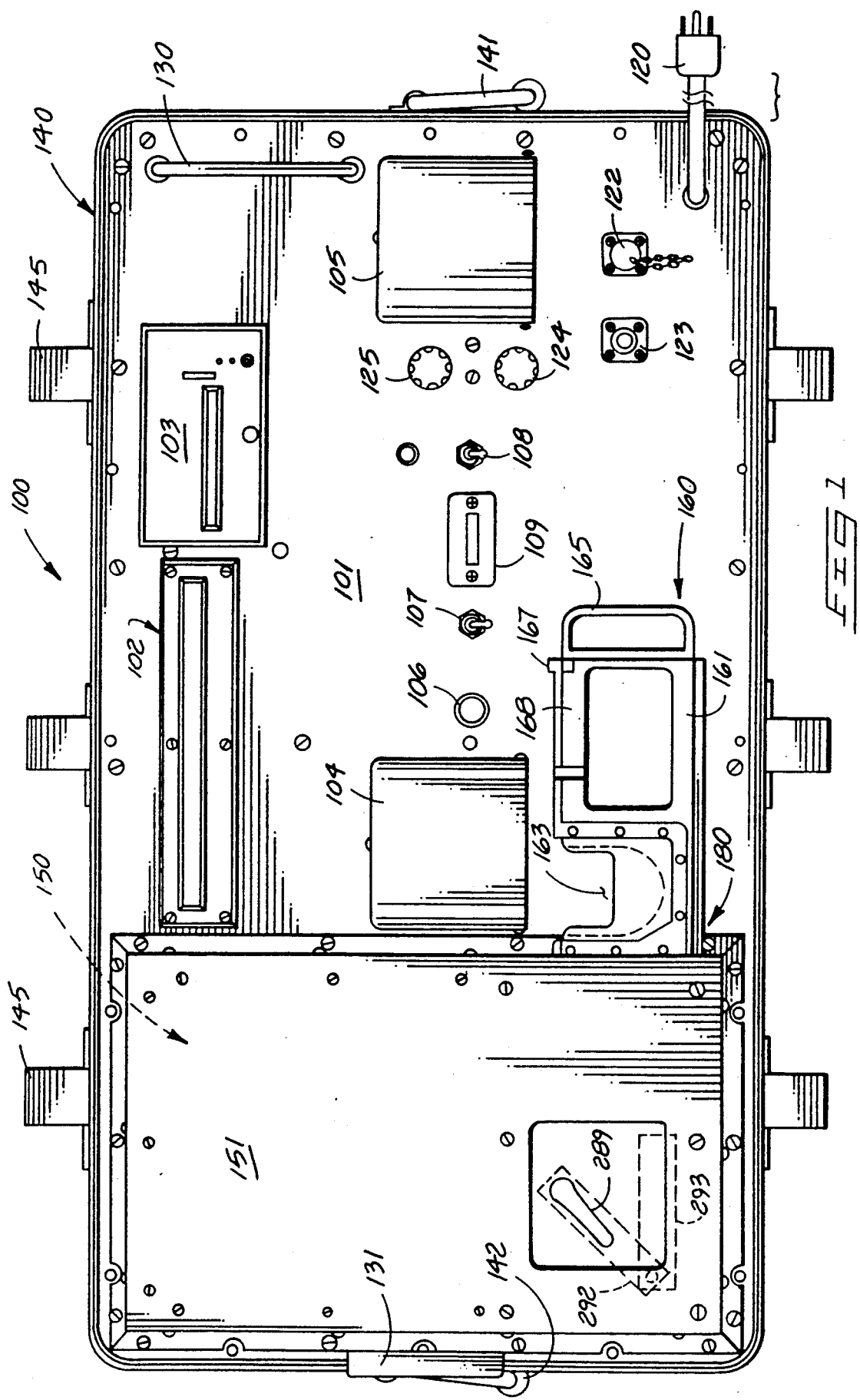

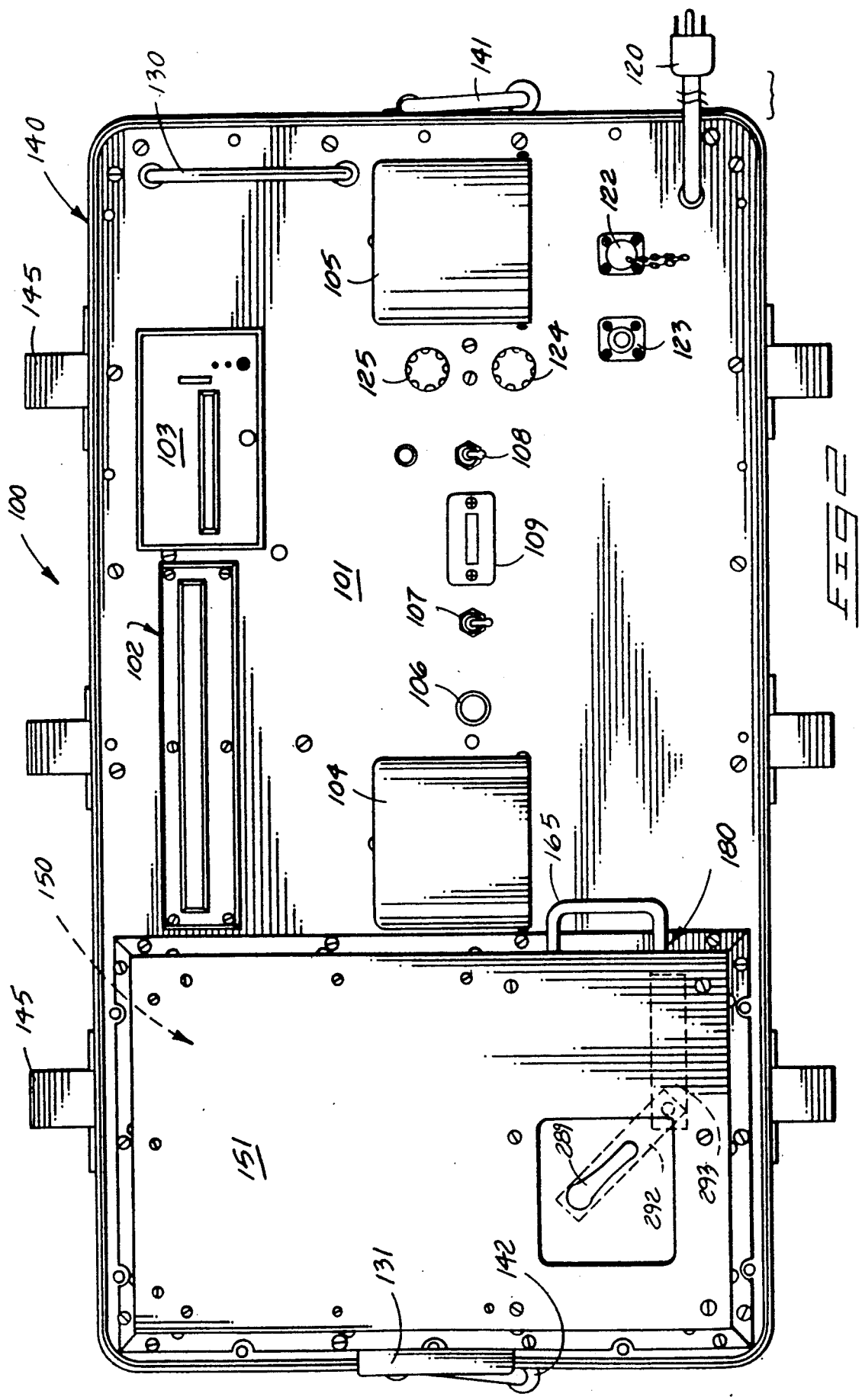

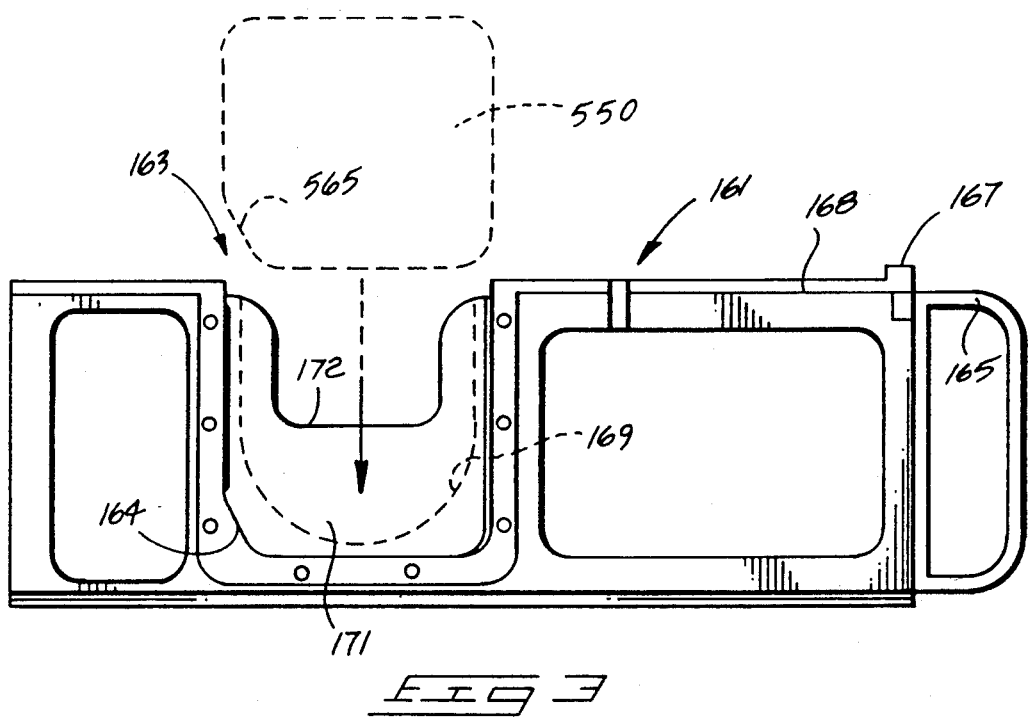
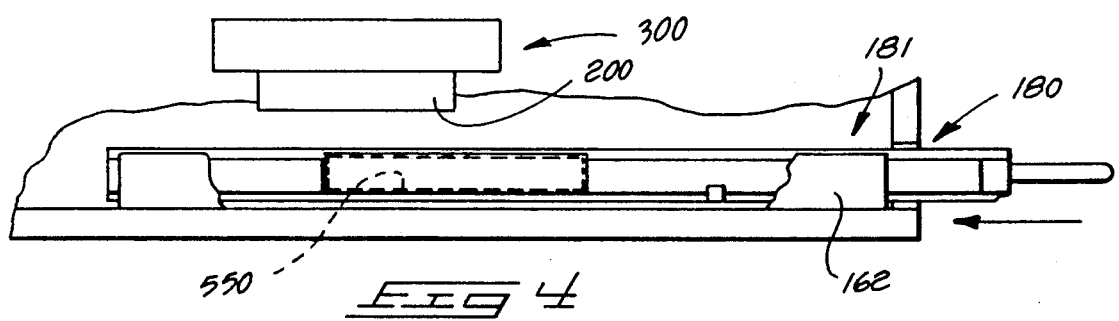
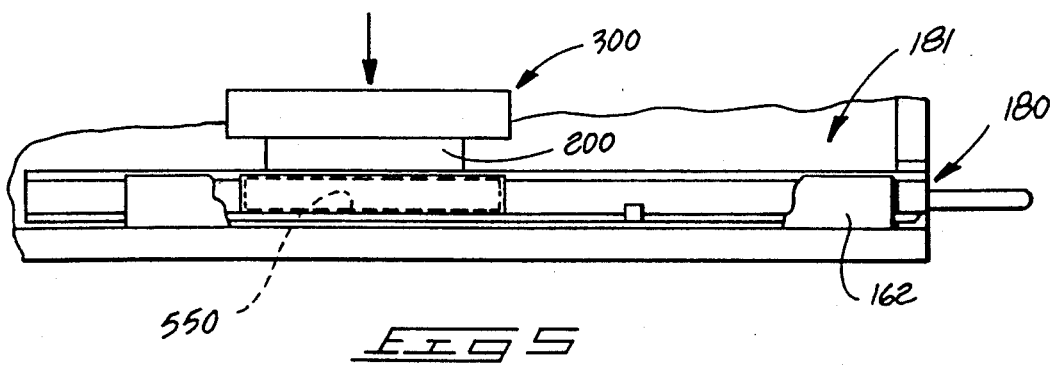

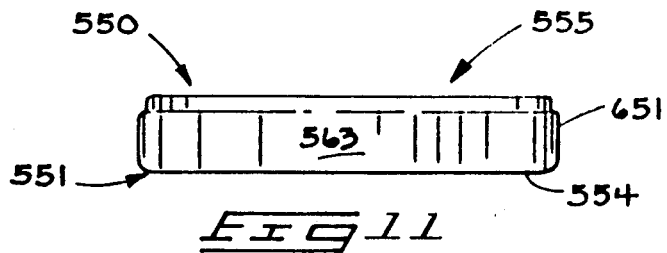
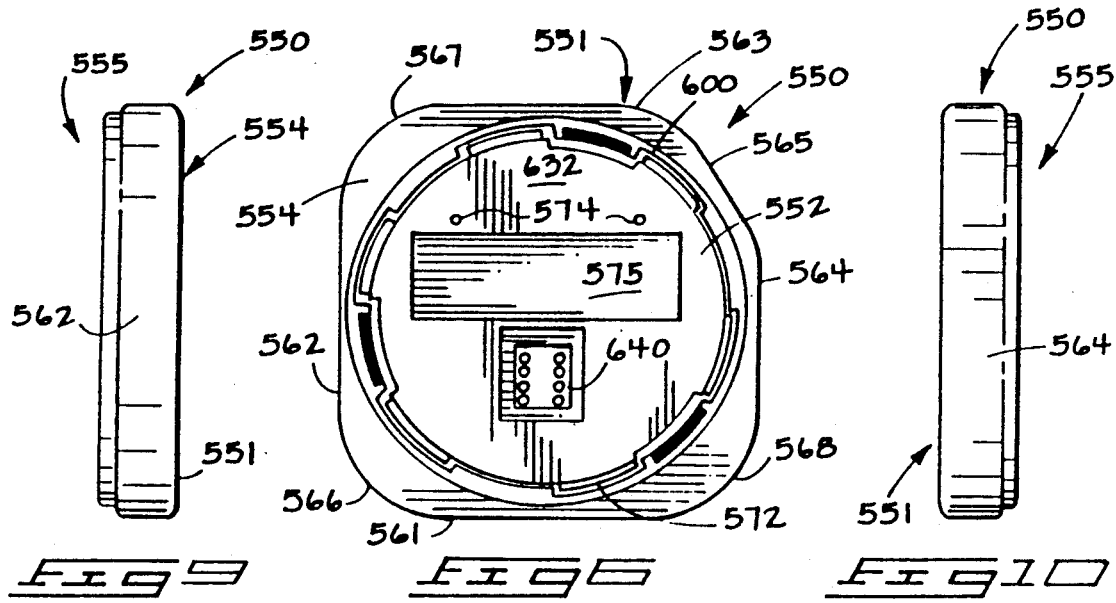
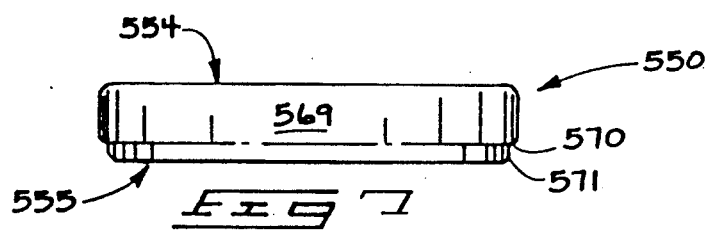
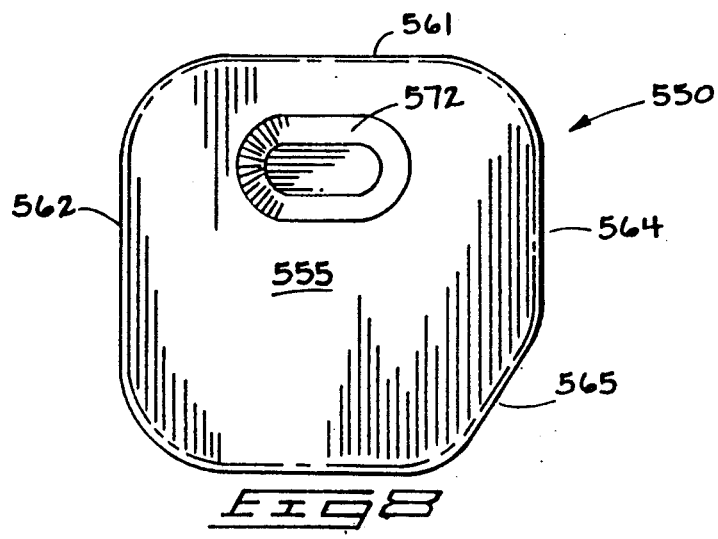

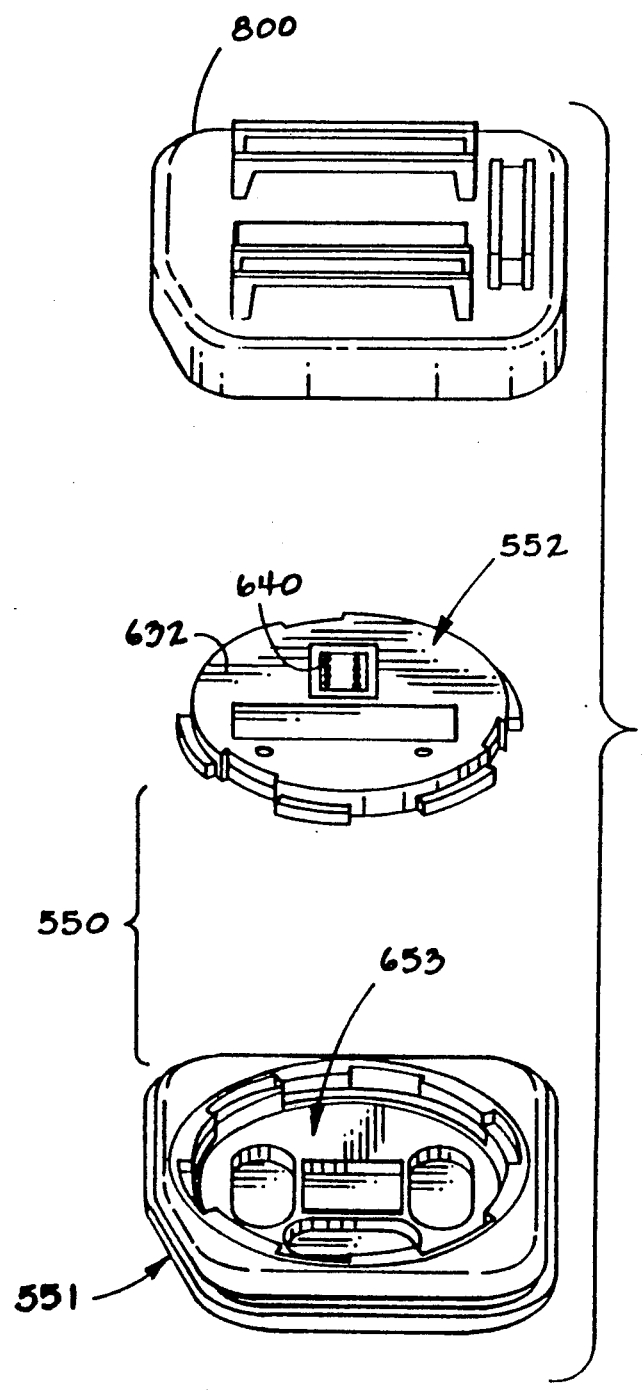

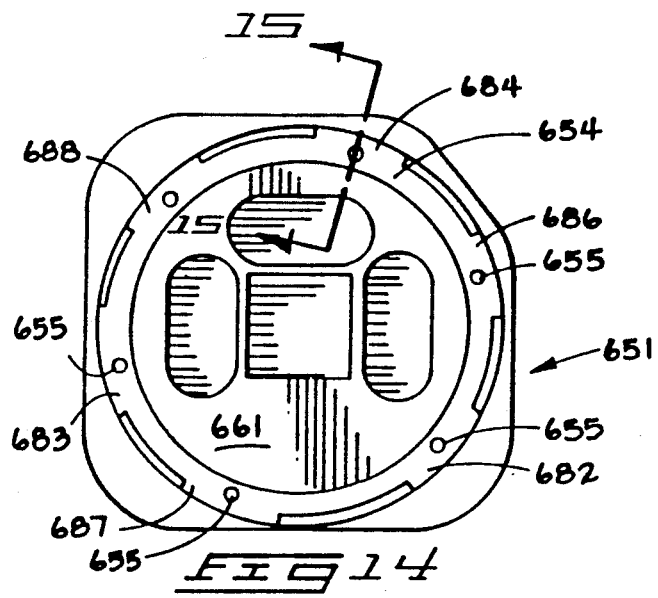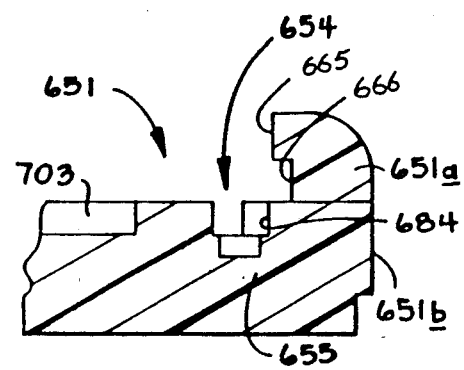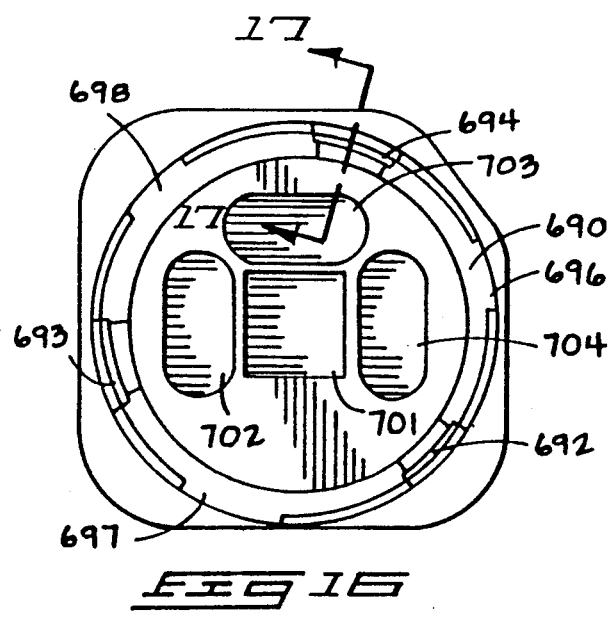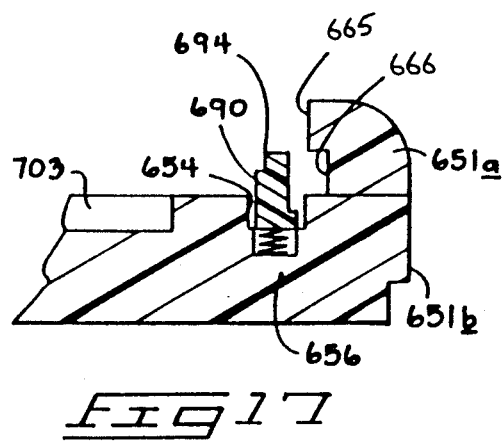

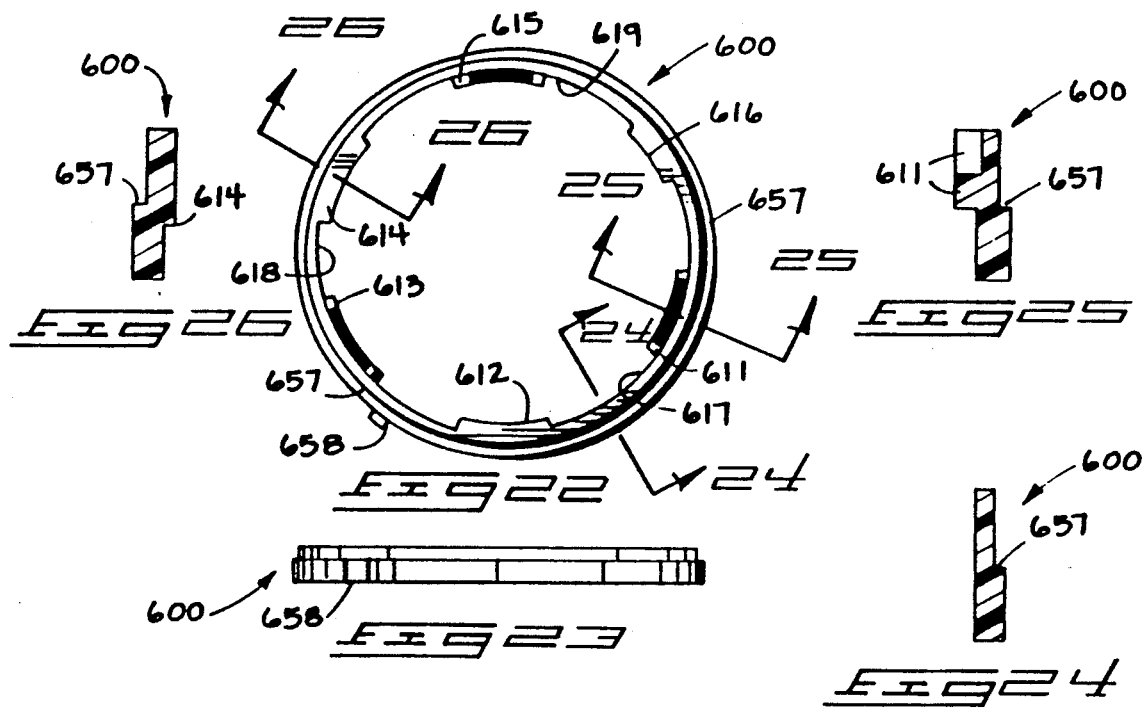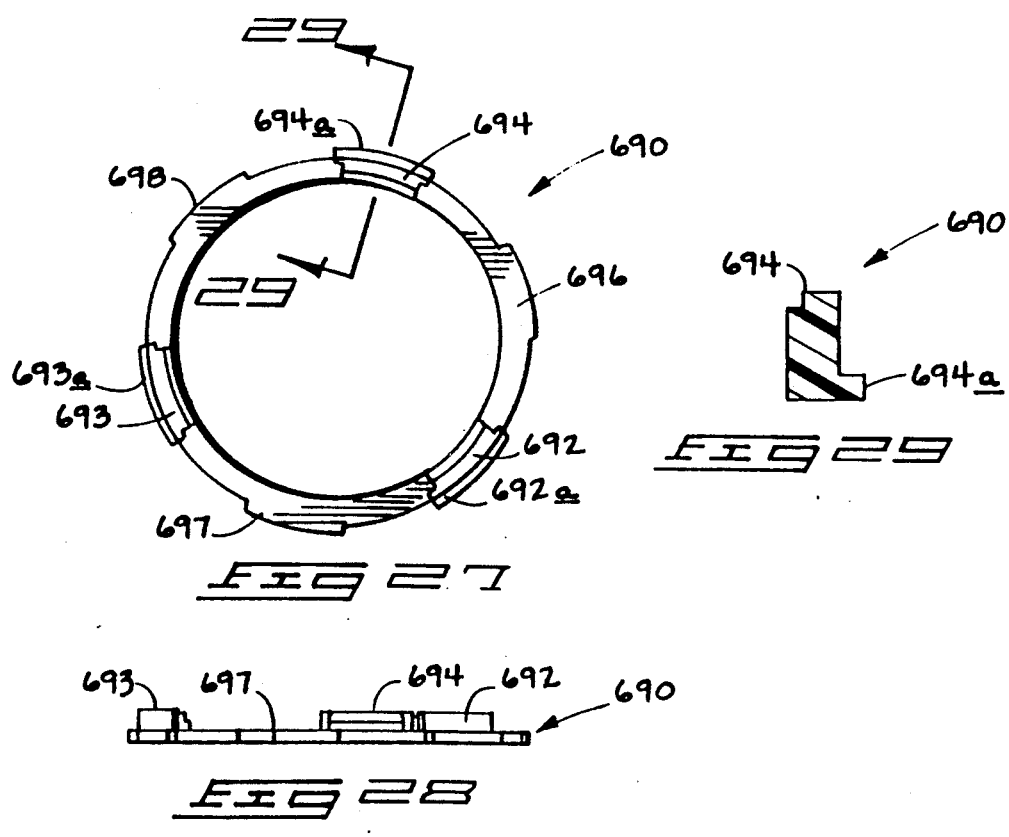

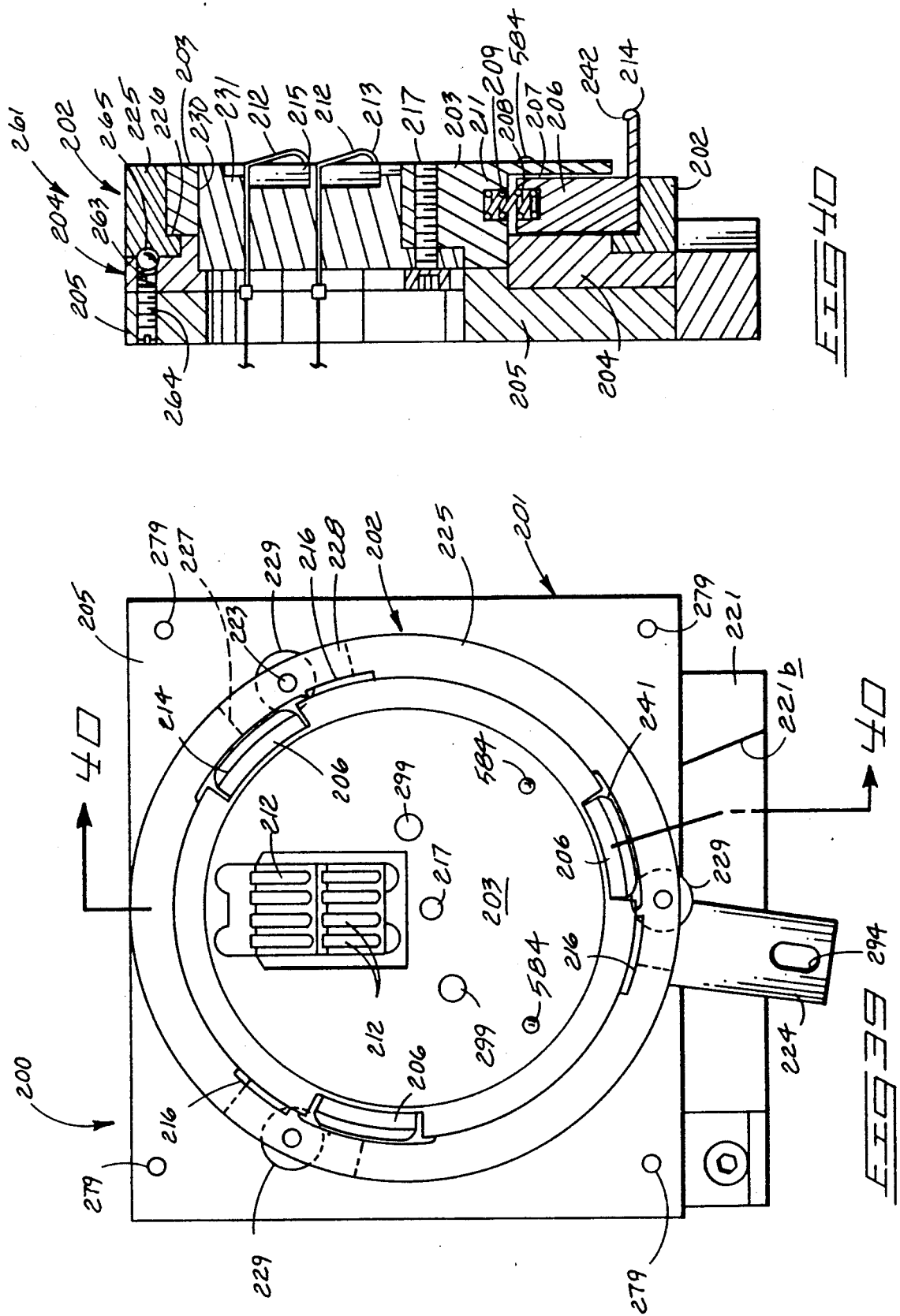

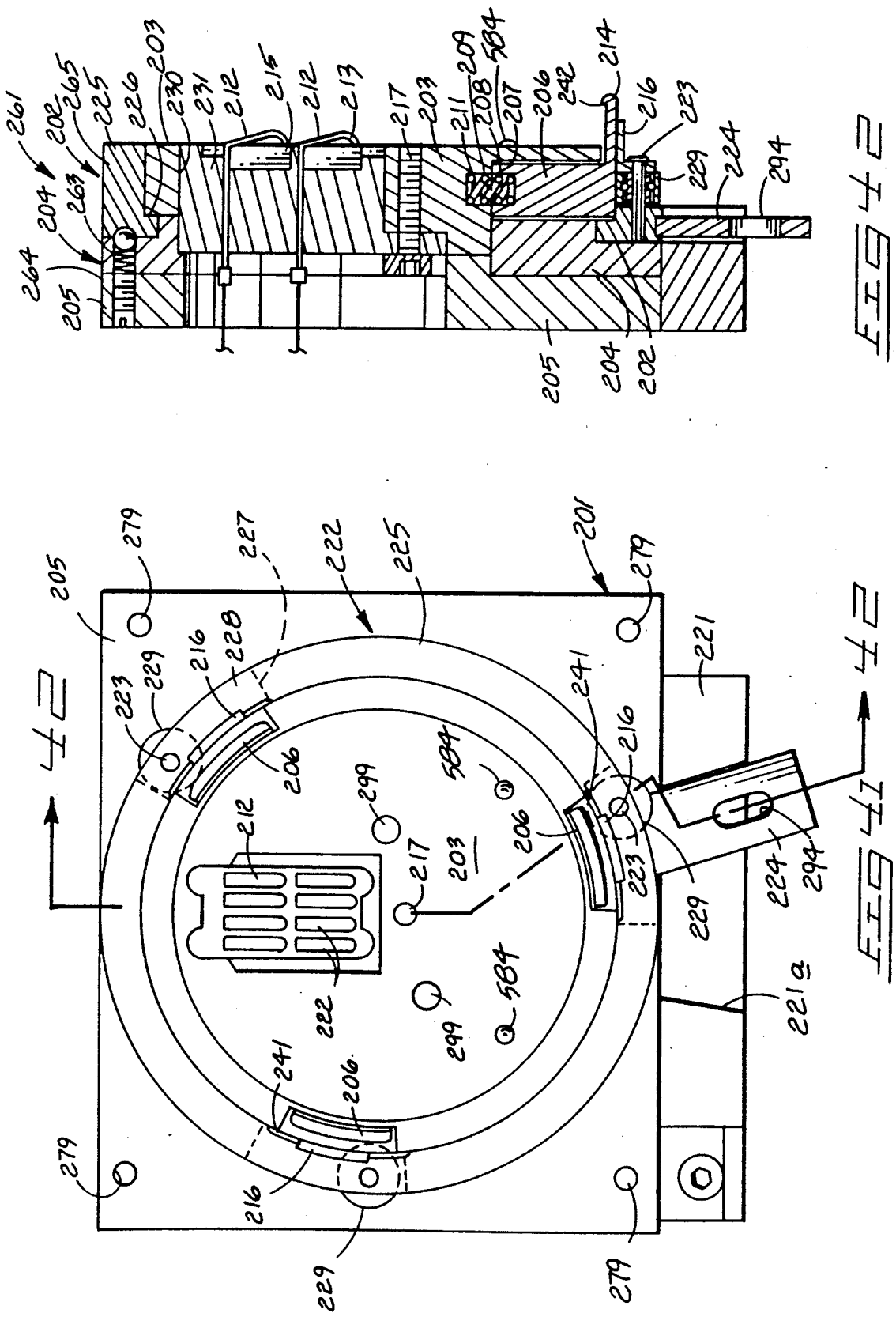

RADIATION DOSIMETER DISASSEMBLY, ASSEMBLY AND READING APPARATUSES AND METHODS

This invention was made with government support under Contract No. N60921-88-C-0085, awarded by the U.S. Department of Defense. The government has certain rights in this invention.

CROSS-REFERENCE TO RELATED APPLICATIONS

This is a continuation-in-part of co-pending U.S. patent application Ser. No. 343,000, entitled "Radiation Dosimeters", filed Apr. 24, 1989 which is incorporated hereinto by reference in its entirety as if set forth in full.

TECHNICAL FIELD

The technical field of this invention is apparatuses and methods for assembly, disassembly, handling and reading of radiation dosimeter badges.

BACKGROUND OF THE INVENTION

It is well-known in the art that certain materials called phosphors can be irradiated with high energy ionizing radiation, and then subsequently stimulated to produce an emission. In the case of thermoluminescent phosphors the stimulation is heat which causes release of the stored ionization energy in the form of a visible light emission commonly called a thermoluminescent emission. Thermoluminescent phosphors are currently in widespread use in radiation dosimeters used to measure the amount of incident radiation to which people, animals, plants and other things are exposed. Thermoluminescent dosimeters are widely used by workers in the nuclear industries to provide a constant monitor for measuring exposure to radiation.

Phosphors are excited by energetic radiation such as ultraviolet, X-ray, gamma, and other forms of radiation. Such ionizing radiation causes electrons within the phosphor material to become more highly energized. The nature of the phosphor materials causes these high energy electrons to be trapped at relatively stable higher energy levels. The electrons stay at these higher energy levels until additional energy, often in the form of heat, is supplied which releases the trapped electrons, thereby allowing them to fall back to a lower energy state. The return of the electrons to a lower energy state causes a release of energy primarily in the form of visible light which is ordinarily termed a luminescent emission. Emission can also occur from phosphors in other energy forms other than visible light although such alternative emissions are not typically used at this time.

The widespread use of thermoluminescent phosphors in personnel dosimeters has led to demand for a large number of dosimeters which must be read on a routine basis in order to monitor exposure of persons or other objects to ionizing radiation. Because of the substantial numbers and the relatively slow reading techniques currently employed, the job of reading dosimeters becomes very time consuming and costly.

There are four commonly known methods of heating thermoluminescent material in order to release the trapped electrons and provide the luminescent emission which is measured as an indication of the amount of ionizing radiation to which the dosimeter was exposed. The first and most common method for heating thermoluminescent phosphors is by contact heating. The second method is heating using a hot gas stream which is impinged upon the phosphor. The third method uses radiant energy in the form of infrared beams which heat the thermoluminescent phosphor. The fourth method uses laser beams to provide the necessary heat or other stimulus for luminescent emission.

In addition to the heat stimulation of phosphors it is also possible to stimulate them with laser beams in a phenomenon call optically stimulated luminescence. In optically stimulated luminescence the laser beam is directed in an intense beam having high power for very brief periods of time. This form of laser stimulation is explained in U.S. Pat. No. 4,507,562 which is hereby incorporated by reference.

The phosphors are incorporated into dosimeters which are mounted in a variety of ways in dosimeter badges. It is preferably that the dosimeters be protected from light, moisture, dust and mechanical deterioration. Light can affect the radiation dose readings given by the dosimeters. Moisture can lead to the deterioration of the phosphor. Dust contamination can lead to incandescence of the contaminating dust particles during laser and other types of heating. Accordingly, it is preferably that dosimeter badges be constructed to protect and enclose the dosimeter elements in a sealed interior compartment.

The monitoring of personnel radiation exposure also suggests the need for personnel dosimeter badges which are tamper resistant so that the wearer or others do not cause changes in the measured dose or damage to the dosimeter elements. Since dosimeter badges can be worn in some applications for periods up to approximately one month before reading is necessary, the desirability of proper protection, containment, and tamper resistance of the dosimeter elements is apparent.

These and other factors have lead to the development of improved dosimeter badges by one of the inventors and his colleagues which include two detachable parts which contain a plurality of dosimeter elements of differing types. Such novel dosimeter badges are described in the U.S. patent application Ser. No. 343,000 described and incorporated by reference hereinabove. The dosimeter elements are preferably maintained in a sealed compartment free from moisture, dust, light and tampering. Because of the desirability of sealed containment of the dosimeters it thus becomes necessary to disassembly the sealed badges to gain access for stimulation of the phosphor-containing dosimeters held within the badges. When such novel dosimeters are read using laser beams or other means, it is thus typically necessary to separate the complementary parts of the dosimeter badge to expose the dosimeter elements for stimulation of the phosphor and detection of the luminescent or other emission caused by such stimulation. The emission is then used to indicate the amounts and types of ionizing radiation to which the dosimeter element was exposed. The large number of badges which must be read causes substantial amounts of time to be consumed in merely disassembling and reassembling the dosimeter badges, aside from the time needed to read the phosphors.

The current invention relates to improved methods and apparatuses for assembling and disassembling dosimeter badge components which aid in the automated handling and reading of such badges. The invention includes improved methods, tools, dosimeter badge assembly and disassembly apparatuses, and dosimeter reading apparatuses which incorporate them.

BRIEF DESCRIPTION OF THE DRAWINGS

Preferred embodiments of the invention are illustrated in the accompanying drawings which are briefly described as follows.

FIG. 1 is a front elevational view of a preferred dosimeter reading apparatus constructed in accordance with the invention. The view shows a dosimeter holding slide arrangement in the open receiving position.

FIG. 2 is a front elevational view similar to FIG. 1 with the dosimeter holding slide arrangement in a closed inserted position.

FIG. 3 is a front view showing key components of the dosimeter holding slide arrangement and a dosimeter badge in phantom.

FIG. 4 is a top diagrammatic view of the dosimeter holding slide arrangement shown in FIG. 3 with the dosimeter partially inserted.

FIG. 5 is a top diagrammatic view similar to FIG. 4 with the dosimeter fully inserted and engaged by a novel dosimeter badge disassembly, holding, and assembly head according to this invention.

FIG. 6 is a plan view showing the top surface of a preferred dosimeter badge used with the reader of FIG. 1 and novel methods according to this invention.

FIG. 7 is a front edge view of the dosimeter badge of FIG. 6.

FIG. 8 is a plan view of the bottom face of the dosimeter badge shown in FIG. 6.

FIG. 9 is a left edge view of the dosimeter badge shown in FIG. 6.

FIG. 10 is a right edge view of the dosimeter badge shown in FIG. 6.

FIG. 11 is a rear edge view of the dosimeter badge shown in FIG. 6.

FIG. 13 shows an assembly view showing the dosimeter badge of FIG. 6 and further showing a badge holder.

FIG. 14 is a top plan view showing in isolation a case portion of the base assembly forming a part of the dosimeter badge of FIG. 6.

FIG. 15 is an enlarged partial sectional view taken along line 15—15 of FIG. 14.

FIG. 16 is a top plan view showing the case portion of the base presented in FIG. 14 with a tamper ring installed therein.

FIG. 17 is an enlarged partial sectional view taken along line 17—17 of FIG. 16.

FIG. 22 is a top plan view showing in isolation the locking ring included in the dosimeter badge of FIG. 6.

FIG. 23 is an edge view of the locking ring shown in FIG. 22.

FIG. 24 is an enlarged sectional view taken along line 24—24 of FIG. 22.

FIG. 25 is an enlarged sectional view taken along line 25—25 of FIG. 22.

FIG. 26 is an enlarged sectional view taken along line 26—26 of FIG. 22.

FIG. 27 is a top plan view showing in isolation the tamper ring incorporated in the dosimeter badge of FIG. 6.

FIG. 28 is an edge view of the tamper ring shown in FIG. 27.

FIG. 29 is an sectional view taken along line 29—29 of FIG. 27.

FIG. 39 is a front elevational view of a preferred dosimeter opening tool and chuck assembly according to this invention. The chuck assembly is in a position used to engage a dosimeter badge which is closed.

FIG. 40 is a sectional view of the assembly of FIG. 39 taken along line 40—40.

FIG. 41 is a front elevational view similar to FIG. 39 with the chuck assembly moved into a position assumed to open a dosimeter badge.

FIG. 42 is a sectional view of the chuck assembly of FIG. 41 taken along line 42—42.

DETAILED DESCRIPTION OF THE PREFERRED EMBODIMENTS

Figure 12:
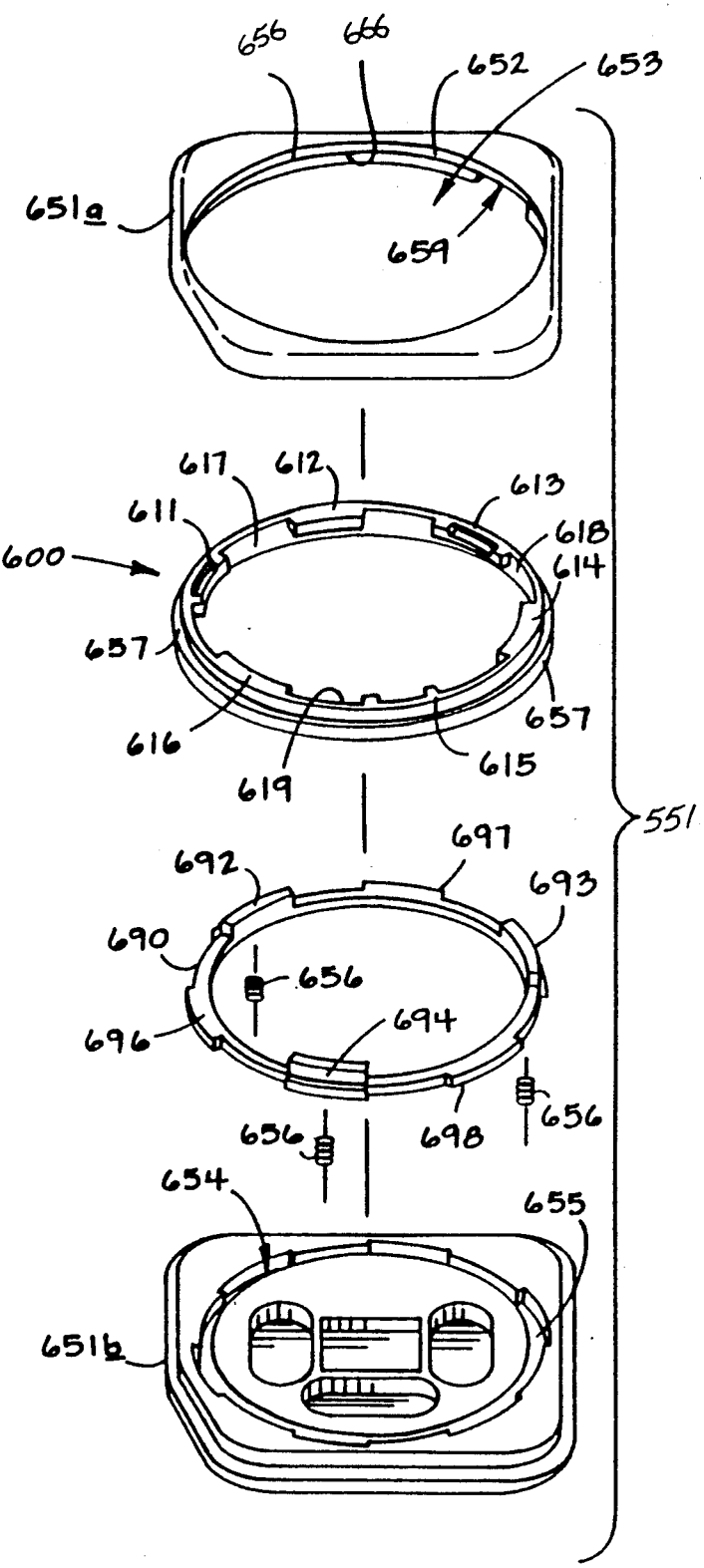
FIG. 12 is an exploded assembly view showing the base assembly portion forming a part of dosimeter badge of FIG. 6.

The following disclosure of the invention is submitted in furtherance of the constitutional purpose of the Patent Laws "to promote the progress of science and useful arts" (Article 1, Section 8).

FIG. 1 shows a preferred form of dosimeter reading apparatus 100 according to this invention. The dosimeter reading apparatus 100 is a laser stimulating thermoluminescent phosphor reading apparatus constructed in accordance with the teachings of U.S. Pat. No. 4,839,518, entitled "Apparatuses and Methods for Laser Reading of Thermoluminescent Phosphors", issued June 13, 1989, which is hereby incorporated hereinto by reference. That patent describes the various optical components and control system features which are preferred for use in radiation dosimeter reading apparatuses made in accordance with this invention. Also exemplary of suitable laser optical systems which can be used in conjunction with reader built in accordance with this invention are the teachings contained in U.S. patent application Ser. No. 336,015 incorporated by reference hereinabove. A variety of laser powered optical arrangements can be used in dosimeter reading apparatus of this invention to provide the desired laser beam characteristic or characteristics for stimulating of the dosimeter elements held by dosimeter badges. Alternatively, it may be possible to incorporate stimulating beam sources other than laser beams for use in dosimeter reading apparatus incorporating the novel features according to this invention.

Dosimeter reading apparatus 100 includes a front panel 101 which includes a digital display 102 and printer 103. The display 102 displays operational commands and dose exposure information. The printer can print dose exposure information. Two ventilation covers 104 and 105 are shown covering an exhaust vent and fan intake, respectively. A dosimeter read cycle activation switch 106 is pushed to start the reading cycle. A printer control switch 107 is used to control operation of an auxiliary, external printer or plotter 402 (FIG. 48) which can be used to print the dose information displayed by display 102 and luminescent glow curves measured in producing the dose information. A power on-off switch 108 is also mounted on the front panel, as is an hour meter 109 which indicates total operational time.

Figure 48:
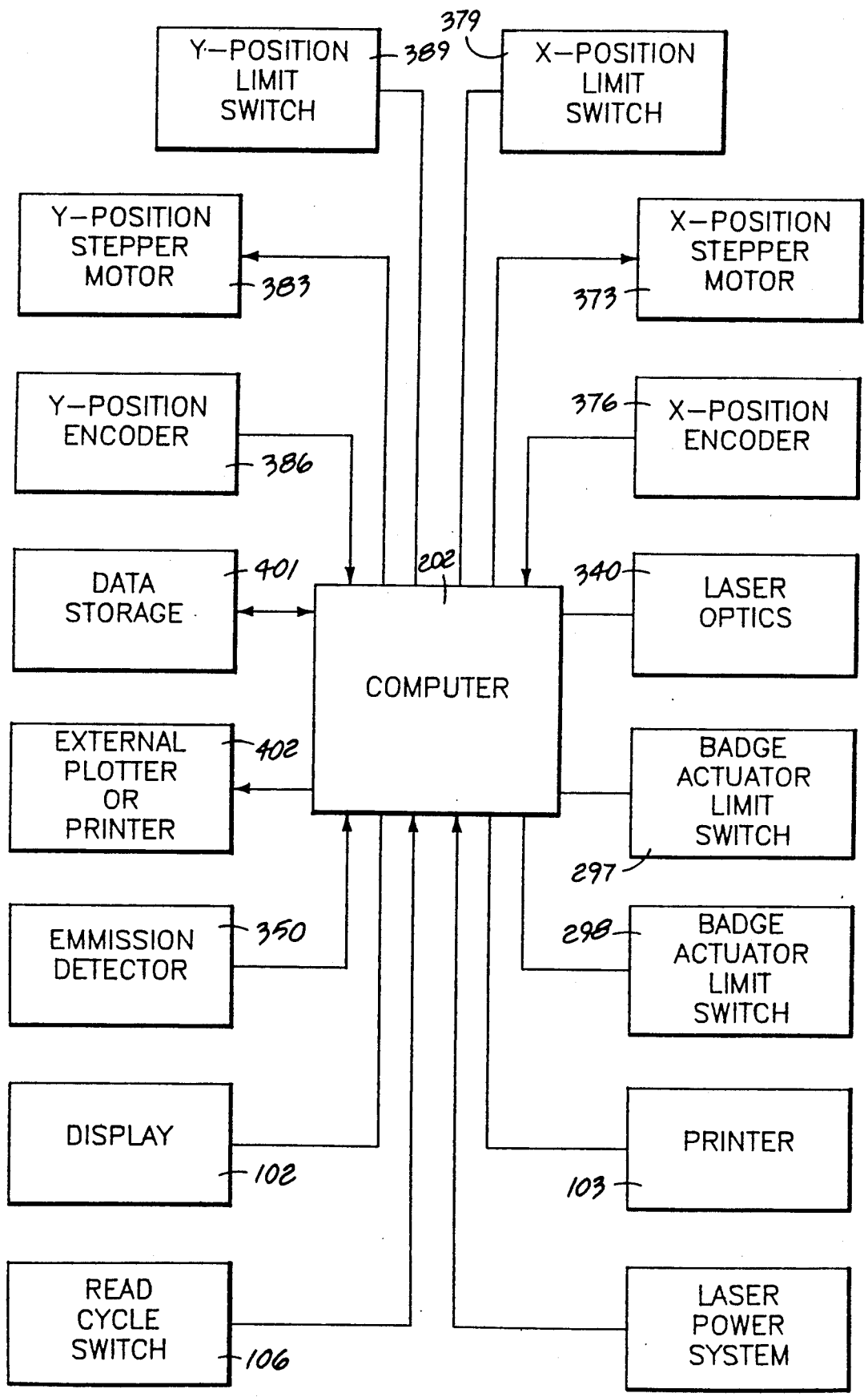
FIG. 48 is a block diagram of a preferred control system which can be used in the dosimeter reading apparatus shown in FIG. 1.

The front panel also mounts a power cord 120 for providing 120 volt a-c power to the reader. An electrical connector 122 includes electrical conductors which are appropriately connected to key signal and circuit components for use in diagnosing electrical system problems which might develop in the reader. The electrical connector also serves as an electronic signal port for connecting an external computer to the reader for programming the reader and to advantageously serve as an external data storage 401 (FIG. 48), either in addition to or in substitution of data storage mounted on the reader 100. A signal output connector 123 is provided to transmit glow curve and dose information signals to the auxiliary printer or plotter 402 (FIG. 48). A fuse receptacle 124 and spare fuse receptacle 125 are also shown.

Handles 130 and 131 are mounted to the front panel to aid in disassembly of the unit. The reading apparatus is advantageously provided with a rugged case 140. The case is preferably made of FIBERGLASS or other suitable resin and fiber composite material, and is most preferably shielded with nickel. Case 140 mounts carrying handles 141 and 142. The case also includes six (6) heavy duty over-center luggage type fasteners 145 which clip over and hold a case cover (not shown) which covers the front panel 101.

The left part of the dosimeter reader as shown in FIG. 1 includes a dosimeter badge reading compartment 150 which is covered by a reading compartment front panel 151 which can be removed. The reading compartment front panel is normally installed and forms a cover over the light and dust tight reading compartment 150. The reading compartment is shown with cover 151 removed in FIG. 45, which will be described in greater detail below.

FIGS. 1 and 2 show that the dosimeter reader includes a dosimeter infeed mechanism 160. The dosimeter badge infeed mechanism 160 is advantageously provided in the form of a sliding dosimeter badge holder 161. The sliding dosimeter badge holder 161 includes a slide framework 168. The slide framework is mounted by slide tracks 162 (see FIGS. 4 and 5) which are mounted on the inside of the cover 151 in a well-known fashion to form a slideway 181. The sliding dosimeter holder further includes a dosimeter badge receptacle 163 which is mounted on the slide framework 168 as shown in greater detail in FIGS. 3-5.

The dosimeter badge receptacle is shaped to receive the irregular shape of dosimeter badge 550 in a unique manner so that the badge can only be fully accepted into the receptacle 163 when the badge is properly oriented. The clipped corner 565 of the badge provides such a unique fit when the receptacle 163 has a correspondingly shaped corner 164.

The sliding dosimeter badge holder further advantageously includes a handle 165. The handle 165 is integral or rigidly connected with slide framework 168. Adjacent to the handle is a flange 167 which acts as a stop when the slide is fully inserted and further serves as a dust and light seal which covers the slide receiving opening 180.

The diagram of FIG. 4 shows the dosimeter badge holding slide assembly in a partially closed position. FIG. 5 shows the dosimeter badge and supporting slide assembly 161 fully inserted into the slideway 181 which holds the slide assembly. FIG. 2 also shows the badge infeed slide assembly fully inserted into the reading compartment by sliding the slide assembly 161, inwardly to the left as indicated by FIGS. 1 and 2.

FIGS. 4 and 5 further diagrammatically show a dosimeter badge disassembly, assembly, engagement and positioning chuck or tool assembly 200 and limited portions of its supporting tool positioning head 300. The tool assembly is used to engage the dosimeter badge when the badge is held by the sliding dosimeter badge infeed mechanism in the fully inserted engagement position shown in FIG. 5. In FIG. 4 the positioning head and tool assembly are held in a somewhat retracted standby position awaiting insertion of the badge which is to be disassembled, read, and reassembled. FIG. 5 shows the positioning head and chuck tool assembly relocated to a badge engagement position wherein the tool assembly is positioned against the badge with engagement of certain prongs (not shown in FIG. 5)

which manipulate components of the badge, in a manner which will be more fully explained hereinafter. To give full access of the tool assembly to the dosimeter badge 550 the badge receptacle 163 is provided with an interior face which is substantially opened as defined by the receptacle interior face rim 169 shown in hidden line in FIG. 3. The opposite exterior side 171 of the badge receptacle is provided with a cutout rim 172 which provides for easier grasping and removal of the badge from the slide assembly.

Before going on to a complete description of the tool assembly which is used to assemble, disassemble and hold portions of the dosimeter badge, it is believed advantageous to consider a preferred form of the dosimeter badge which is handled. Accordingly, the following description details such a preferred dosimeter badge.

FIGS. 6–11 show the preferred dosimeter badge 550 for which the dosimeter reader 100 is adapted to read in an automated manner. Dosimeter badge 550 is constructed using two major parts, a first part, case or base assembly 551 and a second part or insert assembly 552. Dosimeter reader 100 is adapted to disassemble the disk-shaped insert assembly from the base assembly, and to position and expose dosimeters which are normally sealed within the badge to a stimulating laser beam. Badge parts 551 and 552 are adapted for securement together into a dosimeter badge assembly which is advantageously adapted to enclose a sealed dosimeter mounting and containment area.

Badge 550 has a top or insert mounting face 554 and a bottom or back face 555. The shape of the dosimeter badge includes four side edges 561–564 which are generally square in basic shape. The rear or third side edge 563 is connected by a 30° diagonal corner 565 to the fourth or right side edge 564. The square shape and 30° diagonal corner provide the unique shape for unique reception in the badge receptacle 163. The left or second side edge 562 is connected to the front side edge 561 at a rounded corner 566. Similar rounded corners 567 and 568 are between the second and third side edges 562 and 563, and first and fourth side edges 561 and 564, respectively. The outer periphery of the badge 550 has an edge or side wall 569 with a shoulder 570 and reduced-size bottom side wall portion 571. Shoulder 570 and reduced side wall portion 571 provide secure engagement with a badge holder 800 shown in FIG. 13.

The bottom surface 555 of the badge is advantageously provided with a contoured recess 572 to provide desired thickness of the case for a particular level of radiation filtering or other radiation-affecting purpose. Recess 572 also reduces distortion when produced by molding and can further be used to provide surface recognition if desired for automated handling.

FIG. 13 shows that badge part 551 includes an insert receptacle 653 which receives the insert assembly 552 therein. The combined dosimeter badge 550 can advantageously be held in the badge holder 800.

FIG. 6 shows that the badge insert assembly or second part 552 is advantageously shaped in a generally circular arrangement to form a disk. The top or exterior face 632 of second part 552 is advantageously provided with a label mounting recess 575 for receiving and protecting any visual badge label mounted thereon. Two indentations 574 are provided for engagement by two complementary locating pins 584 (see FIG. 39) on the chuck assembly 200. The locating pins preferably have pointed conical tips for guiding the chuck assembly into precise registration with the dosimeter badge insert 552.

The exterior surface 632 of the insert is also advantageously adapted to mount an electronic memory device 640. The electronic memory device is advantageously a suitable type of electrically erasable programmable read only memory device which are known in the art and commercially available. Suitable forms of electronic memory devices for incorporation in dosimeter badge 550 are illustrated by the disclosures in one or more of U.S. Pat. Nos. 3,971,916; 4,007,355; 4,092,524; and 4,102,493; which are hereby incorporated by reference in their entirety. The electronic memory device includes eight (8) electrical contacts 641 which are engaged by suitable electrically conductive members or contacts 212 (shown in FIG. 39), for powering the memory chip and reading stored information therefrom. The memory chip advantageously includes information about the calibration factors for each dosimeter element, the date last read, a serial number or other identifier, the type of dosimeters included in the badge, and any other relevant information desired in connection with the reading and interpreting of dose exposure information from the dosimeters of badge 550.

FIG. 12 shows the base assembly 551 in an exploded view to detail the components advantageously included. Base assembly 551 includes a base case 651 which is advantageously made in two pieces for molding purposes, a top face base piece 651a and a bottom face base piece 651b. The top and bottom base pieces are permanently bonded together capturing the locking ring 600, tamper ring 690, and tamper springs 656. The top piece 651a includes an insert receptacle opening 652 which defines portions of the base case insert receptacle 653. The peripheral walls of the base case receptacle defined by the top face piece has an upper portion 665 with a diameter which is less than the diameter of a groove portion 666. This stepped arrangement for the upper part of the insert receptacle is designed to retain the locking ring 600 in axial position within the base. The locking ring has a corresponding stepped outer peripheral surface 657.

FIG. 12 also shows that the base assembly 551 advantageously includes an optional tamper-resistant means which is shown in a form which utilizes a tamper ring 690. Tamper ring 690 is received within the bottom of the insert receptacle 653, within a specially shaped tamper ring groove 654. The bottom surfaces of the tamper ring groove are provided with spring receptacles in the form of small cylindrical indentations 655. The spring receptacles receive very small compression type tamper springs 656 which are used to bias the tamper ring upwardly from the bottom of the insert receptacle toward the opening 652. In certain tamper-resisting locking positions of the movable locking ring, the tamper ring prongs 692-694 extend into spaces 617-619, respectively, between the inwardly overhanging extensions 611-616. This allows the tamper ring locking prongs 692-694 to move upwardly to angularly lock the locking ring at a locking position in which the insert assembly 552 is held within the receptacle 653 in a tamper-resistant, locked condition.

The locking ring 600 is unlocked from engagement by tamper ring 690 by inserting and operating a tool, such as tool assembly 200 described below. The dosimeter badge tools preferably have three (3) tamper element prongs 214 (FIG. 40) which are inserted into annular slots between the insert assembly periphery and the inside wall of the locking ring to engage upper surfaces of the tamper ring locking prongs 692-694 and depress the tamper ring downwardly to release the locking ring for limited angular travel.

Figure 20:
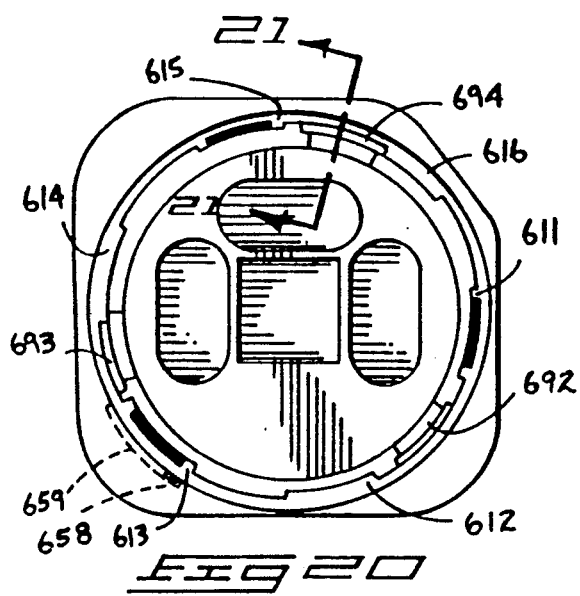
FIG. 20 is a view similar to FIG. 18 showing the locking ring held within the dosimeter base rotated to a position different to that shown in FIG. 18 to illustrate the engagement of the locking ring by the tamper ring.

FIG. 12 also shows that the base case 651 is provided with a locking ring limit groove 659 (see also FIG. 20). Limit groove 659 is adapted to receive an angular travel limit projection 658 (see FIG. 22) to extend thereinto. Limit groove 659 is about 35° of arc, sufficiently long to allow angular travel of the locking ring 600 of about 30° of arc, as the ring rotates within the receptacle confined radially by surfaces 665 and 666.

FIGS. 14-21 further illustrate the construction and interaction of the tamper-resisting mechanism provided by the base case 651, locking ring 600, and tamper ring 690. FIGS. 14 and 15 show the case base 651 without either the tamper ring 690 or the locking ring 600 installed. The tamper ring groove is provided with lateral recesses 682-684 for receiving laterally extending bosses 692a, 693a, and 694a on the tamper ring (see FIG. 27). Similarly, the tamper ring groove 654 includes additional lateral extensions 686-688 for receiving tamper ring lateral bosses 696-698, respectively. The unique engagement so provided between the tamper ring groove 654 and the tamper ring 690 prevents rotation of the tamper ring when it is installed in the groove and held in place by the overlying locking ring 600. The tamper ring thus installed prevents rotation of insert assembly 552 when properly held in receptacle 653.

The base case also includes a receptacle central floor zone 661 defined within the tamper ring groove 654. The central floor is advantageously provided with appropriate recesses 701-704 which define the thickness of the case at selected locations adjacent dosimeters to provide desired radiation affecting properties. The recesses also allow installation of radiation affecting filters (not shown) therein. In general the depth of the recesses 701-704 vary.

FIGS. 16 and 17 show the base case in combination with the tamper ring 690 which is installed in the tamper ring groove 654. The tamper ring is upwardly biased by springs 656, as shown in FIG. 17.

Figure 18:
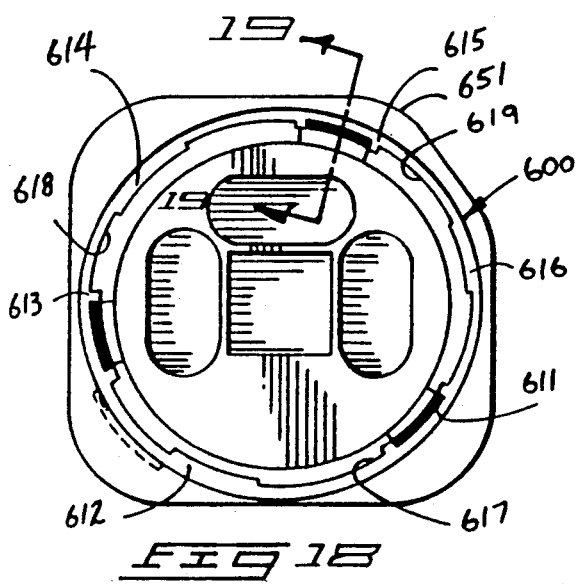
FIG. 18 is a view similar to FIG. 16 with an additional installed locking ring shown in the case portion of the base assembly.
Figure 19:
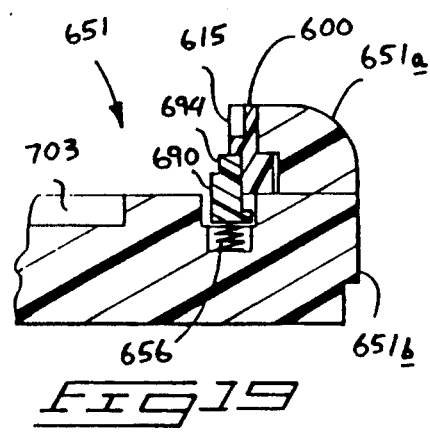
FIG. 19 is an enlarged partial sectional view taken along line 19—19 of FIG. 18.

FIGS. 18 and 19 show the base assembly 551 in a further state of assembly which includes both the tamper ring and locking ring 600 installed therein. The tamper ring prong 694 is held down by locking ring interior extension 615 thus keeping the tamper ring in the retracted unlocked position.

Figure 21:
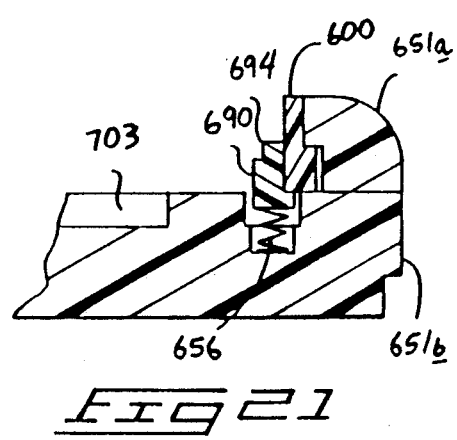
FIG. 21 is an enlarged partial section view taken along line 21—21 of FIG. 20.

In FIGS. 20 and 21 the locking ring 600 is shown rotated counter-clockwise about 30° of arc to displace the extension 615 from above prong 694. Similar displacements also occur with respect to the other interior extension of the locking ring 611 and 613 which move from their overlying positions upon tamper ring prongs 692 and 693. This in turn allows the tamper ring to move axially upward to position prongs 692, 693 and 694 along locking ring surface spaces 617, 618 and 619, respectively. Thus the tamper ring engages and locks the locking ring in angular position.

FIGS. 22-24 show the locking ring 600 in isolation with the features explained hereinabove. FIGS. 27-29 similarly show the tamper ring 690 in isolation with the features explained hereinabove.

Figure 30:
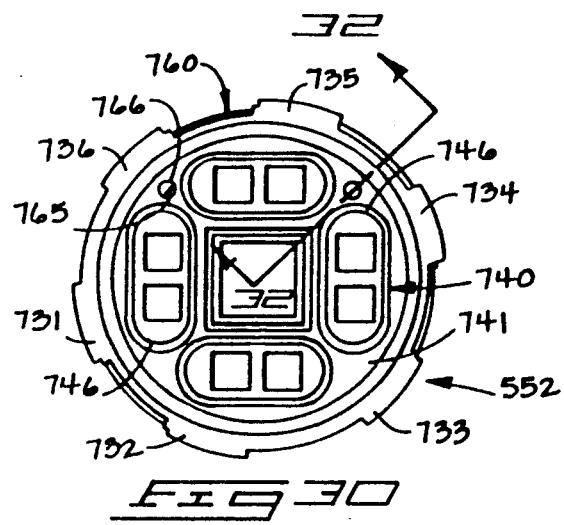
FIG. 30 is a plan view showing the interior face of an insert assembly forming a part of the dosimeter badge of FIG. 6.
Figure 33:
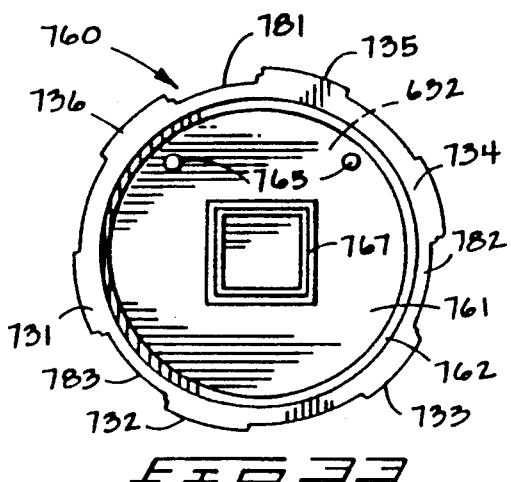
FIG. 33 is a plan view showing a concealed face of an exterior piece component forming a part of the insert assembly shown in FIG. 30.
Figure 31:
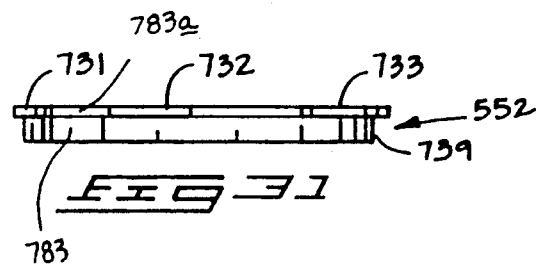
FIG. 31 is an edge view of the insert assembly shown in FIG. 30.
Figure 34:
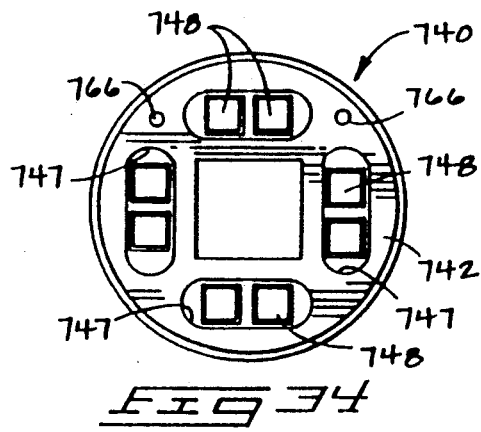
FIG. 34 is a plan view of a concealed face of an interior piece component forming a part of the insert assembly shown in FIG. 30.
Figure 35:
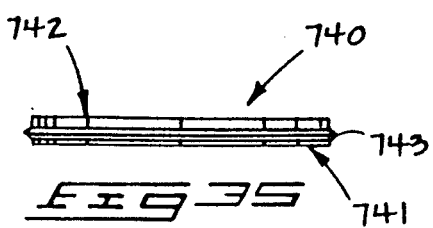
FIG. 35 is an edge view of the component shown in FIG. 34.

FIGS. 30 and 31 show the dosimeter badge insert or second part assembly 552. The insert assembly 552 includes two main pieces, namely, an interior insert piece 740 and an exterior insert piece 760. FIG. 33 shows the exterior insert piece in isolation, and FIGS. 34 and 35 show the interior insert piece in isolation.

Figure 32:
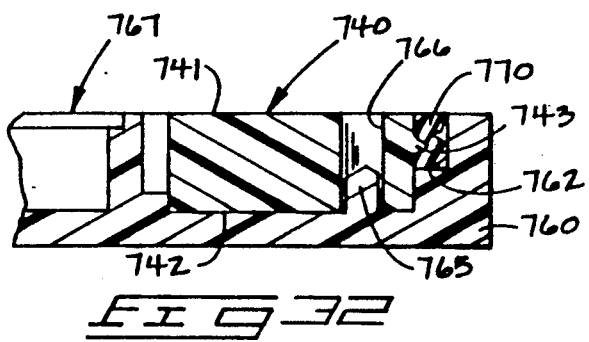
FIG. 32 is a sectional view taken along line 32—32 of FIG. 30.

The exterior piece 760 has an enclosed face 761 and an exterior face 632. The enclosed face is substantially planar with an outer raised band 762 formed near the edge of the enclosed face for supporting a seal 770 (see FIG. 32). The enclosed face also advantageously includes two raised studs 765 which are used to correctly position the interior piece 740 in correct relationship. The studs 765 are received in apertures 766 formed in the interior piece. The enclosed face of the exterior piece 760 also advantageously includes a neutron dosimeter receptacle 767 for mounting a fast neutron dosimeter, such as described in the co-pending U.S. patent application Ser. No. 336,015, incorporated by reference hereinabove. The receptacle has an outer shoulder which provide a space for installing any desired lateral radiation shield or radiation affecting filter.

The exterior piece 760 is further defined about its outer periphery by a plurality of outwardly projecting major diameter portions 731-736 which are appropriately shaped and sized to mate with corresponding major circle sections defined by the interior of the locking ring 600. For example, projection 734 fits into section 618, and portion 736 fits into section 619. When the insert assembly 552 is fully installed the projections 731-736 are overpositioned by the locking ring inward projections 611-616, respectively. The locking ring projections move relative to the stationary insert assembly by sliding along a substantially cylindrical portion 739 (see FIG. 31). The insert assembly 552 does not rotate within the insert receptacle, instead the locking ring is rotated from an open position which is relatively clockwise, as shown in FIG. 18, into the closed position which is relatively counter-clockwise, as shown in FIG. 20.

The tamper ring 690 is not mandatory for the holding or securement function served by locking ring 600 on the insert assembly, and the tamper ring can be omitted. If omitted it is preferable to include some other means for fixing the angular position of the insert assembly when installed in the base, such as by including a suitably shaped receiving groove (not shown). If included, the tamper ring extends the locking prongs 692-694 to lock the locking ring as explained hereinabove, and also holds the insert in fixed angular position.

To remove the insert assembly the reverse process is used. If included, the tamper ring prongs are depressed at the peripheral slots 781-783 which are immediately adjacent the prongs of the tamper ring. The depressed prongs of the tamper ring allow the locking ring to be rotated clockwise and into the open position of FIG. 18. The inward projections 611, 613 and 615 are specifically adapted with pocket-shaped upper surfaces for receiving locking element prongs 216 (FIG. 40), included on tool assembly 200 to rotate the locking ring.

After the locking ring 600 has been rotated to the open position, the insert assembly 552 is then removed from the insert receptacle by axial outward motion, upward as shown in FIG. 13. The removed insert assembly can then be positioned for laser reading of the luminescent dosimeters mounted along the interior face of the insert assembly interior piece 740.

The insert assembly interior piece 740 is a substantially disk-shaped item having an exposed interior face 741 shown in FIG. 30, and an enclosed face 742 shown in FIG. 34. The peripheral edge of this piece includes a raised rib or ridge 743 (see FIG. 32) which aids in the installation and positioning of the seal 770. Seal 770 and the complementary fitting of the interior and exterior pieces 740 and 760 act to hold the two together as the insert assembly, together with mounted dosimeters.

As shown, the interior piece 740 is constructed with eight dosimeter openings 748 which are formed within four dosimeter mounting receptacles 747. The mounting receptacles 747 are surrounded on the exposed face by filter receiving grooves 746 (see FIG. 30). Dosimeter openings 748 have thin flanged edges which surround and hold a dosimeter or dosimeter assembly including any associated dosimeter frame or mounting device such as described elsewhere herein. The dosimeters are not shown installed in FIGS. 30 or 34, but can be installed in substantially the same manner as described in connection with FIGS. 36-38, or as explained in the incorporated by reference U.S. patent application Ser. No. 343,000.

Figure 36:
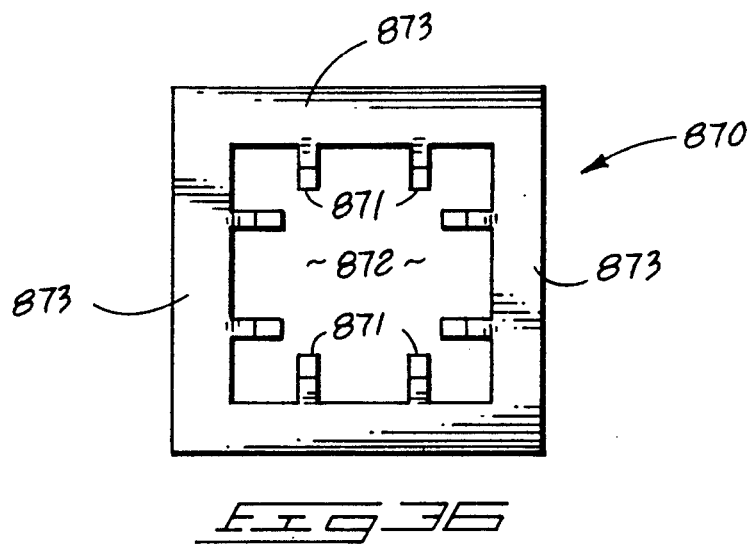
FIG. 36 is a top plan view showing a dosimeter mounting retainer which can be included in the dosimeter badge of FIG. 6.
Figure 37:
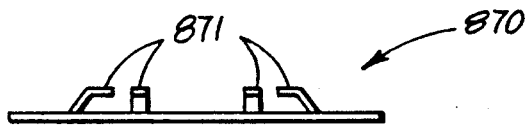
FIG. 37 is a front edge view showing the dosimeter mounting retainer of FIG. 36.

FIG. 36 shows a dosimeter mounting structure 870 according to this invention. Mounting structure or retainer 870 includes a marginal band 873 which extends in a square annular shape about an interior opening 872. A plurality of dosimeter engaging prongs 871 extend in an inwardly and upwardly arched relationship from the marginal band and are preferably integrally connected with the marginal band, such as by forming from the same layer of material. The unit is preferably fabricated as a flat piece and then formed into the shape shown in FIGS. 36 and 37. The prongs 871 hold a dosimeter 20 within the interior opening 872 thereby mounting the dosimeter in a thermally isolated manner which reduces laser heating time and energy requirements. The dosimeter mounting retainer 870 is made of a suitable material, such as a thin metal, preferably stainless steel. The mounting retainer are advantageously made by a chemical photoetching process.

Figure 38:
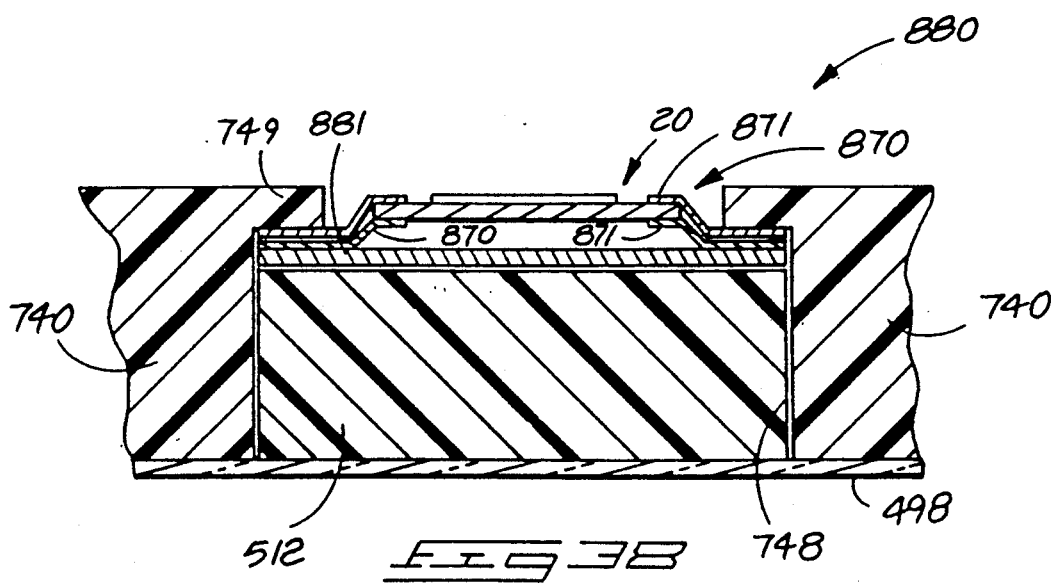
FIG. 38 is a sectional view showing a dosimeter element and dosimeter mounting structure which incorporates two retainers as shown in FIG. 36, all mounted within the dosimeter badge shown in FIG. 6.

FIG. 38 shows a novel dosimeter mounting arrangement 880 which utilizes two of the mounting retainers 870, one on each side of dosimeter 20. The mounting is within a dosimeter mounting opening 748, as shown in FIG. 34. The mounting 880 also preferably uses a thin film of plastic 881 which is positioned in a spaced relationship from the elevated dosimeter 20 and the prongs 871 of the underlying retainer 870. The spaced relationship is important in reducing heat transfer from the dosimeter 20 and minimizing laser heating time and power requirements. The plastic or other film 881 is preferably coated with a reflective layer (not specifically shown) along the upper surface or is made from a reflective material which causes the heat developed in dosimeter 20 during laser heating to be reflected back toward the dosimeter thereby aiding in the laser heating process and minimizing time and energy which must be input by the laser beam. The reflective layer 881 also preferably is reflective to the wavelength of luminescent emission which is being induced by the laser heating thereby assisting in the readout of the luminescent dosimeter information with a minimum of emission loss. The dosimeter mounting assembly is held in place between the lips 749 and a backup piece 512. The backup piece is advantageously held in position by a layer of adhesive tape 498. The dosimeter mount 880 can be used to mount luminescent phosphor chips, and other types of dosimeters.

FIG. 39 shows the front or engagement face of a preferred, novel dosimeter badge assembly, disassembly, and holding tool 200 made in accordance with this invention. Tool assembly or handling chuck 200 includes a first part 201 and a second part 202. The first part is a frame assembly which mounts to the tool positioning mechanism 300 shown in FIG. 5. The second part is a movable assembly mounted on the frame assembly to serve three primary functions. The first function of the second part is to rotate one or more locking element prongs 216 which engage with the pocket-shaped inward projections 611, 613 and 615 form along the inside of the circular locking ring 600. The second primary function of the second part of the tool assembly is to actuate the dosimeter badge holding prongs 214. These badge holding prongs 214 are moved inwardly to contract together and grasp the dosimeter badge insert 552. Thirdly, the prongs 214 also serve as tamper element prongs which bear upon the raised tamper ring prongs 692-694 (FIG. 28) to depress the tamper ring within the badge and release the locking ring 600 to allow the limited, approximately 30° arcuate travel, into the badge open position shown in FIG. 6. The prongs 214 extend along the outer contours of the badge insert 552 at the recesses or peripheral slots 781-783 (FIG. 33).

The first part or frame 201 is an assembly which includes an engagement face piece 203, an intermediate or bearing piece 204, and a back mounting piece 205. The engagement face piece 203 is provided with a contact block cutout 230 which receives an electronic contacts support block 231. The electronic contacts support block mounts a set of eight (8) electrical contacts 212. The contacts are formed to provide spring-like contact ends 213 which can be depressed inwardly within contact receiving recesses 215 formed in the outer face of the contacts support block 231. The contacts support block is fastened to the engagement face piece 203 using fastener 217. The back mounting piece 205 is fastened to the face piece 203 using fasteners 299 (FIG. 39) which hold the chuck assembly together.

A set of three (3) jaw pieces 206 are slidably mounted between the engagement face piece 203 and the intermediate bearing piece 204 within jaw piece mounting slots 207. The jaw pieces 206 are advantageously formed with spring receptacles 208. Corresponding spring receptacles 211 are formed in the engagement face piece 203 at the ends of the jaw piece slots 207. The spring receptacles 208 and 211 receive the biasing springs 209 and allow sufficient length for the desired operation of these springs. The jaw springs 209 bias the jaw pieces outwardly into extended or expanded positions. The second part assembly 202 limits the radial positioning of the jaw pieces.

The second part assembly 202 is mounted on the first part assembly 201 in a manner adapted to allow limited relative rotational motion between these two parts. The second part assembly includes a circularly annular ring member 225 which has a retainer shoulder 226 formed along the inside diameter of the inward face of the ring member. The ring member retainer shoulder engages the inward face of the engagement face piece 203 which retains the ring member in an assembled condition with other parts of the dosimeter badge chuck 200. The chuck assembly is also advantageously provided with a ball and detent assembly 261 having spring 263, and retaining screw 264, and ball 262 which fits into detents 265 when the chuck is in the open or closed positions.

The ring member 225 has three (3) camming wheel mounting wells 227 formed through the ring member from the outer periphery to the inside diameter. The mounting wells 227 are between the inner and outer face thus leaving wall sections 228 of the ring along the inner and outer face which provide the structural support for mounting the camming wheels 229 using pivot pins 223.

The ring member 225 is rotated between the badge closed position shown in FIGS. 39 and 40 into the badge open position shown in FIGS. 41 and 42, by turning the ring in a counterclockwise direction as shown in FIG. 39. This is advantageously accomplished by moving the ring actuator arm 224 from left to right as indicated by FIGS. 39 and 41. The actuator arm is stopped in the open and closed positions of FIGS. 39 and 41 by a stop piece 221 having stop surfaces. The motion of the actuator arm can be accomplished by a motor or solenoid (not shown), or as shown, this is accomplished using the badge opening lever 289 shown in FIGS. 1 and 2. The lever 289 is connected through the front panel 151 to an interior first link 292. The first link 292 is connected to a slide bar 293 which slides as a result of the pivotal action of link 292. The slide bar has a pin (not shown) which is received within the pin receiving slot 294 formed on the actuator arm 224. The position of the badge opening control lever 289 is detected by badge actuator limit switches 297 and 298, shown only in the control diagram of FIG. 48.

The rotary action of the second part assembly not only rotates the ring member 225, but also moves the camming wheels 229 counterclockwise. The camming wheel are mounted to the ring 225 at radial positions which place the most inwardly points of the wheels along a circle which is of smaller diameter than cutout portions 241 formed in the ring member adjacent to the jaw pieces 206. The cutout portions allow the jaw pieces to extend outwardly into the extended position adapted for engaging the dosimeter badge 550 when the badge is in a closed and sealed position. As the ring member is rotated counterclockwise the camming wheels bear upon and displace the slidably mounted jaw pieces 206 inwardly, as illustrated in FIG. 41. This contractionary motion causes the jaw piece prongs 214 to contract against the sides of the dosimeter badge insert 552 at the slotted regions 781-783 (see FIG. 33). The toothed ends 242 of the jaw prongs 214 engage behind small lips, such as lip 783a (see FIG. 31), formed along the slots 781-783. This engagement between the toothed ends of the jaw prongs and the dosimeter badge insert provides positive holding of the dosimeter badge insert 552 in the badge chuck 200. Location of the position of the badge insert in the chuck is more precisely fixed by the engagement of the locating pins 584 into the locating pin receiving holes 574 in the badge insert exterior face 632 (see FIG. 6). Locational precision is important because the insert is precisely moved relative to a stimulating laser beam to expose numerous dosimeters mounted on the interior face 741 of the dosimeter badge insert. In addition to this function of the jaw piece prongs 214, they also serve as the tamper element prongs which depress the tamper ring 690 to disengage the tamper ring from the locking ring 600 and allow the locking ring to be rotated into the unlocked, badge open position. The jaw piece prongs 214 do not however perform this rotational function.

The rotation of the dosimeter badge locking ring 600 is instead performed by the locking elements prongs 216 which are mounted on or integrally formed on the outer face of the ring member 225. The locking prong 216 are angularly displaced relative to the jaw piece prongs 214 when the chuck assembly 200 is in the badge closed position shown in FIG. 39. In this position the chuck assembly is ready to engage a closed badge. When the ring member 225 is rotated into the badge open position the locking prongs 216 are rotated into positions adjacent the jaw piece prong 214, as shown in FIG. 41.

Figure 43:
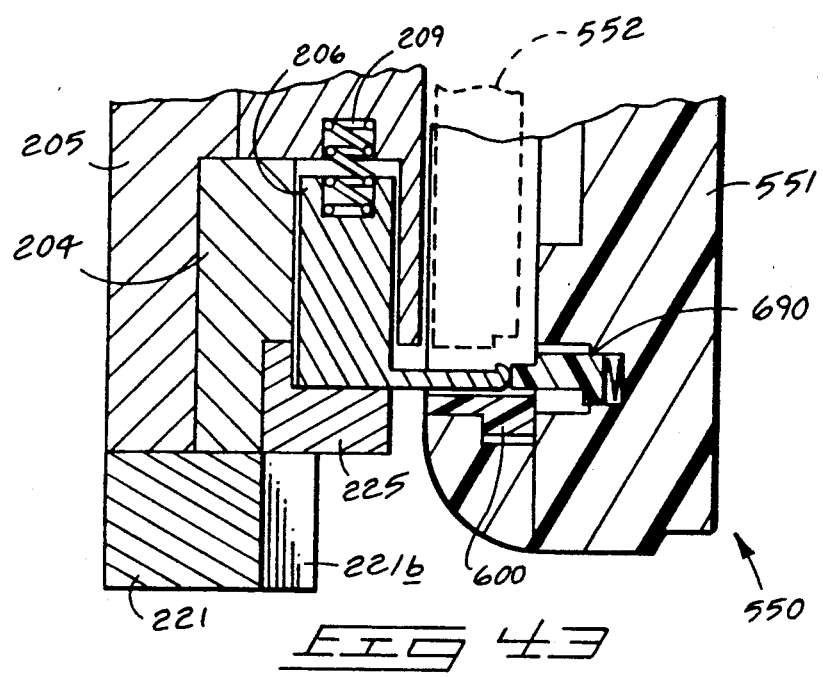
FIG. 43 is a sectional view showing a dosimeter badge as shown in FIG. 6 engaged by the chuck assembly of FIG. 39. The badge is still closed with the tamper ring depressed by prongs of the chuck assembly.
Figure 44:
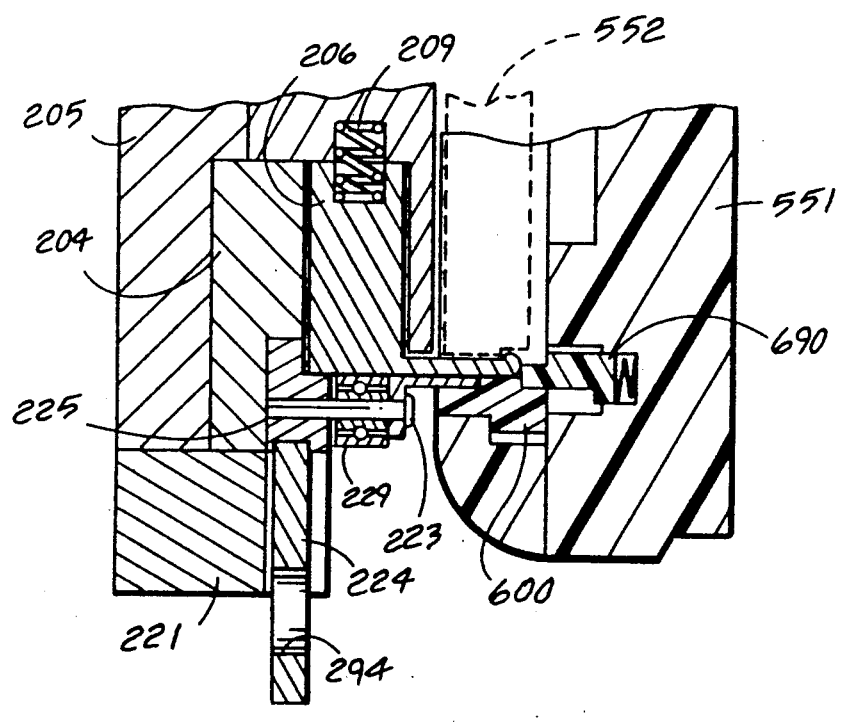
FIG. 44 is a sectional view showing a dosimeter badge as shown in FIG. 6 engaged by the chuck assembly of FIGS. 39 and 41. The chuck assembly has been moved into the position of FIG. 41 to open the dosimeter badge in preparation for extracting the removable disk-shaped dosimeter badge insert.

The operation of the dosimeter holding chuck assembly 200 is further illustrated in FIGS. 43 and 44. FIG. 43 shows the badge 550 with the base portion 551 oriented outwardly to the right as shown in FIG. 43. The diskshaped badge insert 552 is shown positioned within the insert receptacle 653 in the closed and sealed condition. In this initial insertion engagement position the jaw piece prongs 214 bear upon the tamper ring projections 692-694 causing the tamper ring to be depressed from its engaging and restraining position with the locking ring 600.

FIG. 44 shows the engaged chuck assembly and dosimeter badge after the chuck second part assembly has been rotated into the badge open position, also shown in FIG. 41. The camming wheels have engaged and axially depressed the jaw pieces 206. The contracted jaw pieces engage the side edges of the dosimeter insert 552 and hold it in the grasp of the chuck assembly. The locking prongs 216 have rotated adjacent the jaw pieces and moved the locking ring 600 into the open position. The chuck assembly is thus ready to extract the dosimeter badge insert 552 from the base 551.

Figure 45:
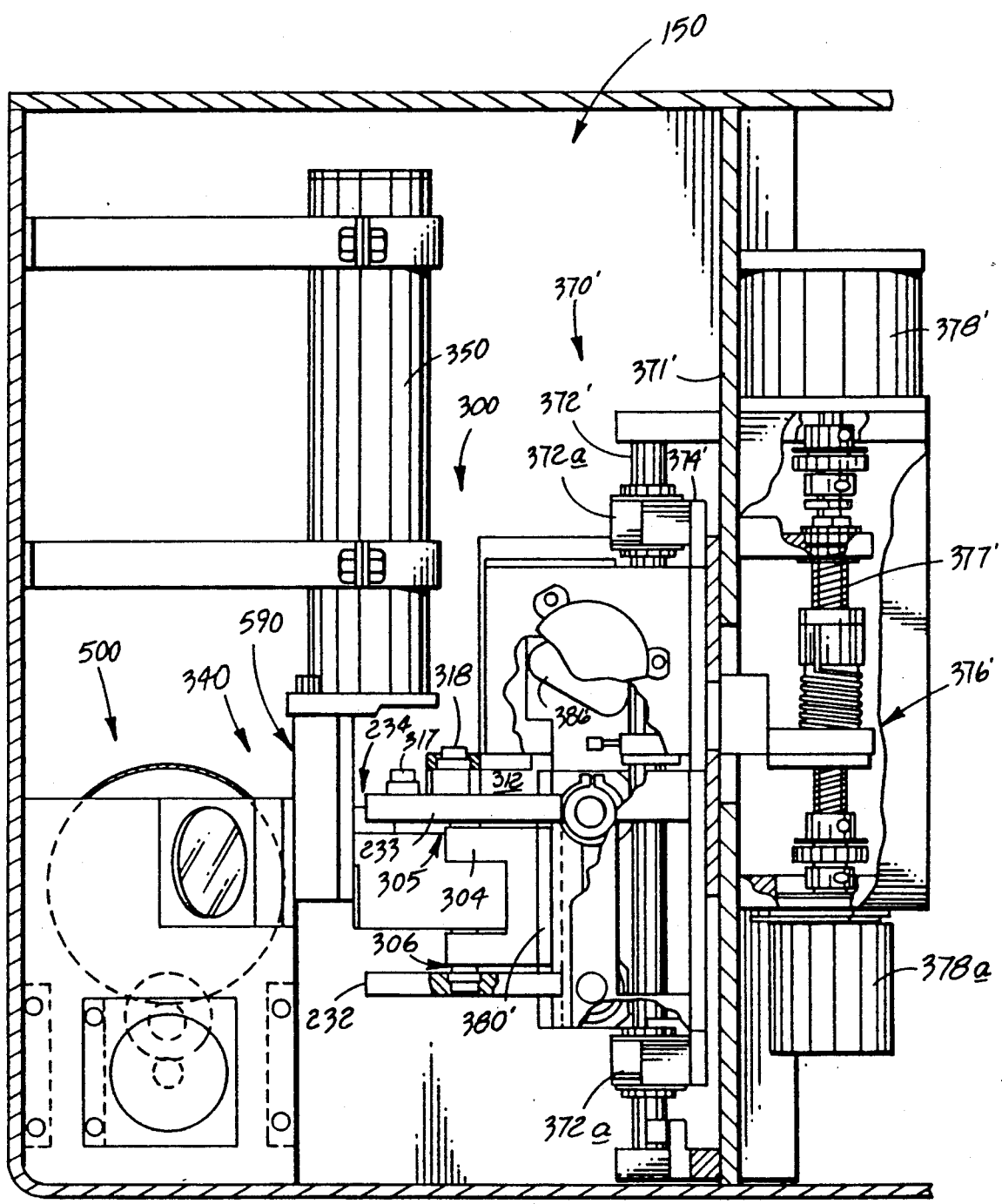
FIG. 45 is a partial front elevational view of the dosimeter reading apparatus of FIG. 1 showing the dosimeter handling and reading area. Portions are broken away and shown in section.
Figure 46:
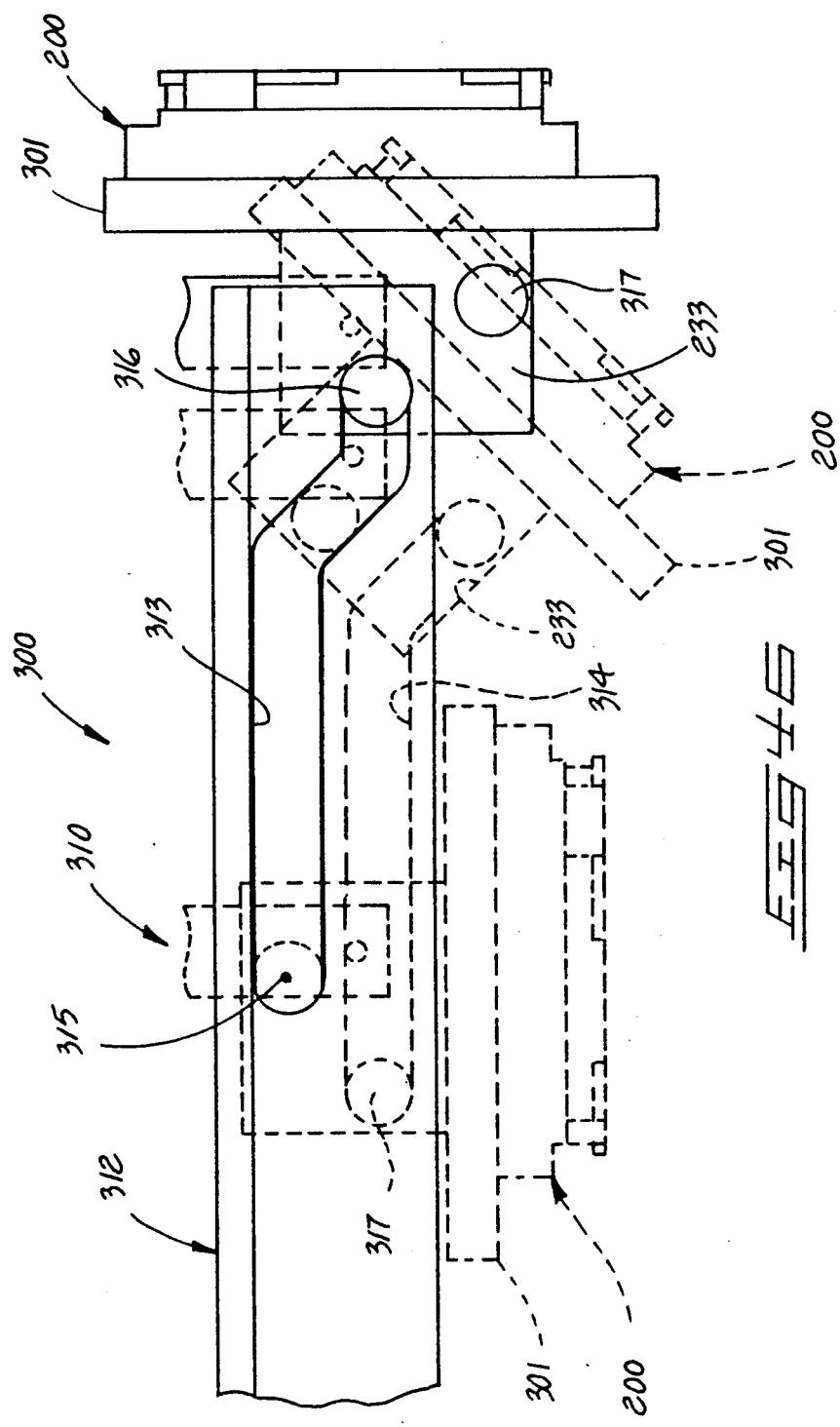
FIG. 46 is a diagrammatic view similar to an enlarged top view of limited portions of the chuck assembly positioner mechanism which mounts and carries the chuck assembly shown in FIG. 39.
Figure 47:
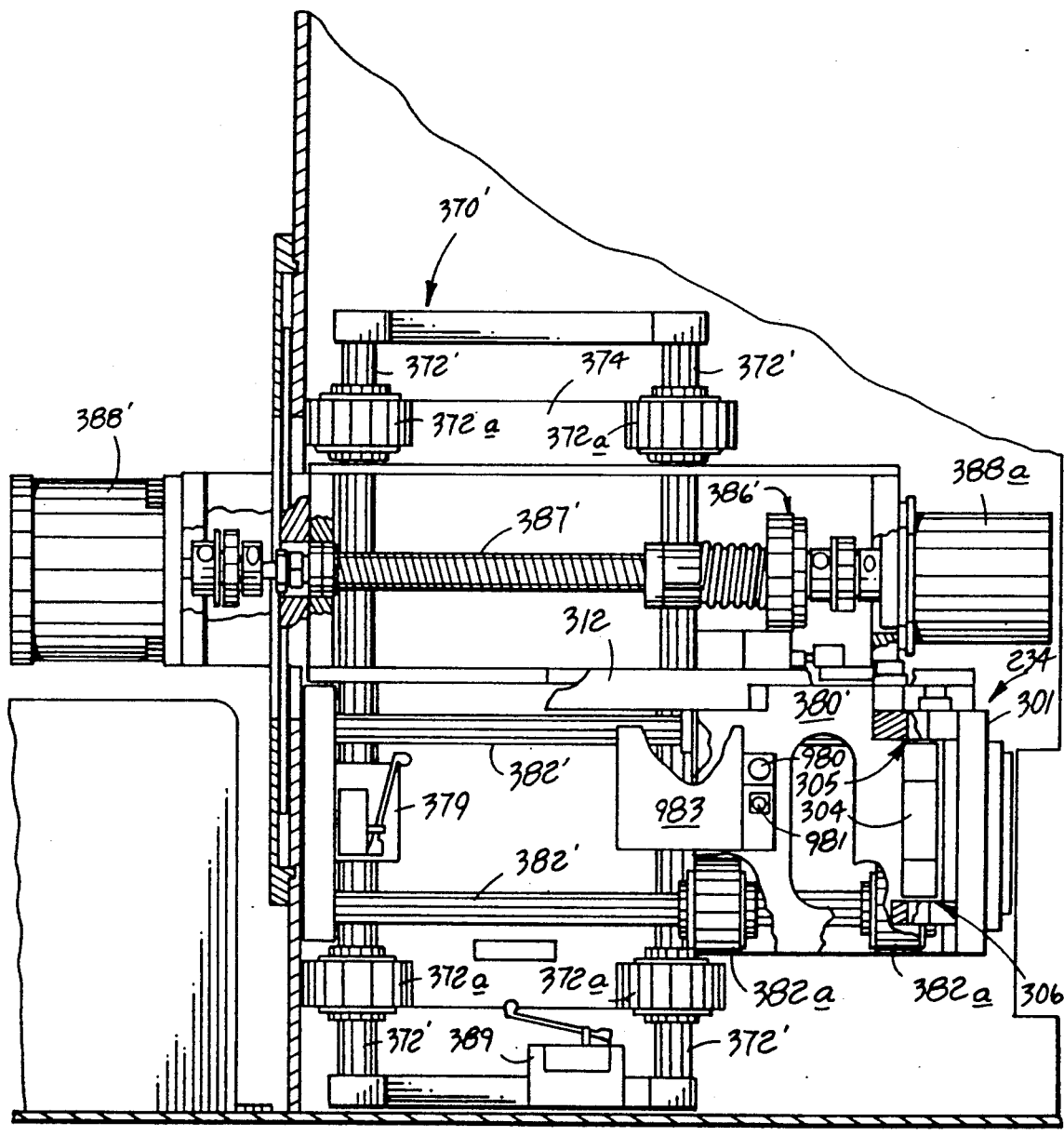
FIG. 47 is an elevational view of the chuck assembly positioner mechanism shown in FIGS. 45 and 46. Portions are broken away and shown in section.

A variety of chuck assemblies or other dosimeter holding and positioning mechanisms can be used in the dosimeter badge reading apparatus made in accordance with this invention. Rotatable tables with extendible chuck mounting heads (not shown), or a large variety of translational stage chuck positioners can be used. FIGS. 45, 46 and 47 show one suitable form of chuck positioner 300 used in the reading apparatus 100. The chuck positioner 300 includes a carrier plate 301 to which the chuck assembly 200 is mounted securely, such as by securing fasteners (not shown) through mounting holes 279 in the chuck assembly 200. The carrier plate 301 is mounted to upper and lower mounting plates 232 and 233 which are pivotally mounted to a U-shaped piece 304 using upper and lower bearings 305 and 306. The carrier plate 301 and mounting plates 232 and 233 form a chuck mounting head 234 pivotally mounted on the U-shaped bracket. The U-shaped bracket is supported on the X stage frame piece 380' which slides along X stage slide rods 382' with adjustment of the X-Y positioner 370'. The X stage piece 380' moves the chuck mounting head along a path which retracts the chuck from the dosimeter engaged position shown in solid line in FIG. 46 and moves it rearwardly, as indicated by the intermediate position and fully retracted reading position, both shown in FIG. 46 in phantom lines.

The chuck positioner 300 further advantageously includes a translational stage camming mechanism 310 which includes a track assembly 312 having a first guide track 313 and a second guide track 314 shown in FIG. 46. The upper mounting plate of the chuck head assembly mounts a set of follower bearings 316 and 317 which extend upwardly and are received within the tracks 313 and 314, respectively, as the X positioner stage retracts the chuck head rearwardly relative to the track assembly 312 which is mounted in a fixed position relative to X-stage motion. This arrange causes the chuck assembly mounting head 234 to pivot and reorient the dosimeter badge chuck assembly 200 into dosimeter badge reading position shown at the left in FIG. 46, which is at approximately a right angle to the orientation of the chuck mounting head when extended into the dosimeter badge engaging position shown in solid line at the right in FIG. 46.

The X-Y positioner 370' is shown most clearly in FIGS. 45 and 47. It includes vertical guide rods 372' and horizontal guide rods 382'. The vertical Y stage guide rods 372' mount linear bearings 372a and the horizontal X stage guide rods mount linear bearing 382a. The horizontal motion of the positioner is driven by a horizontal motion stepper motor 388' which drives a screw shaft 387' and follower assembly 386'. The horizontal position of the positioner is detected by an X position encoder 388a which is connected to the end of the screw shaft and produces an electronic signal representative of the X position which is communicated to the computer 202. The X positioning stage 380' also includes an X position limit switch 379.

A similar arrangement is used to vertically position the Y stage of the X-Y positioner which mounts the X stage slide rods 382' upon which the X stage and chuck mounting head are mounted. The Y stage includes a slidably mounted stage piece 374' to which the X stage is mounted. The Y stage is driven by a stepper motor 378' via a lead screw 377' and screw follower assembly 376'. Y position encoder 378a provides an electronic signal indicative of the position of the Y stage. A Y position limit switch 389 is also advantageously included.

FIG. 46 shows the basic operation which both translates and rotates the chuck 200 as the chuck is moved from the badge engaging position into a reading position shown at the left in phantom in FIG. 46. This positions the dosimeter insert 552 being held with the interior face outwardly adjacent to opening 594. The stimulating laser beams impinge upon the dosimeter elements causing an emission which is collected by the emission collector assembly and detected by photomultiplier tube 350.

Although description has been made of one type of positioner for the dosimeter badge chuck assembly, the invention is not to be construed as requiring any particular form of positioner for the chuck assembly and a variety of robotic arms, X-Y positioners, rotational positioners and others are alternatively possible.

A convertible optics block assembly 500 forms a part of a stimulating laser beam and detection head 340 but is not further described herein since that invention is not a part of this application and is covered in a companion application filed herewith. Other types of stimulating beams can alternatively be incorporated into readers including the chuck tool assemblies and other features according to this invention.

A small radioactive light source 980 is also preferably mounted on the X stage 380' for use as a calibrating light detected by detector 350 when the source 980 is properly positioned. An incandescent spot 981 can also be included for heating by the laser or other stimulating beam to incandescence also for calibrating the detection of emissions. A protection plate 983 is further shown for covering the laser emission and detection opening (not shown).

FIG. 48 shows a preferred form of control system which can be used to operate the parts of dosimeter reader 100 relevant to the present invention. The control system includes an on-board computer 202. The computer receives information from the X and Y encoders 376 and 386 and produces signals which drive the X and Y stepper motors 373 and 383 to desired positions. Data storage is coordinated through the computer to a data storage unit 401. The computer can also drive an internal printer 103 or an auxiliary external printer or plotter 402 which prints dose exposure related emission information, glow curve information or other information as desired. The computer receives the emission information from the emission detector 350. Laser optics unit 340 is preferably adjustable and controlled to provide two different types of stimulating laser beams to read different types of dosimeters mounted on badge 550. The X and Y position limit switches 379 and 389 are also connected to computer 202 to indicate full travel of the positioning stages. The computer 202 is preferably programmed to provide automatic operation of the dosimeter badge reader.

Novel methods and processes according to this invention include methods for releasing a multiple part dosimeter badge having at least one detachable portion, such as insert 552, from remaining portions of the dosimeter badge, such a dosimeter badge base portion 551. The methods involve positioning the dosimeter badge in a desired location with the detachable portion exposed for removal, such as by inserting the badge in the slide infeed assembly 160 into the desired engagement position shown in FIG. 5 and holding the badge in such position exposed for engagement.

The positioned badge is then processed by engaging a dosimeter badge tool assembly, such as chuck assembly 200, against the badge to provide an operative engagement therebetween which releases the detachable portion of the badge. Such can advantageously include depressing or otherwise disengaging a tamper-resistant element, such as tamper ring 690, from a locking element, such as locking ring 600. This is advantageously accomplished by depressing the tamper ring using the tool assembly prongs 214 which serve as tamper element prongs in this capacity. The tamper ring is preferably depressed at multiple points spaced along the ring against the biasing action of the tamper springs 656. Where the dosimeter badges are provided without a tamper-resistant feature such as tamper ring 690, then the disengagement step is not needed.

The methods further include rotating or otherwise moving the locking element or elements, such as locking ring 600, to release the detachable badge insert. This is advantageously accomplished by detachably engaging the locking element 600, such as by inserting the locking element prongs 216 into an engaging position with the locking ring 600, such as at the multiple spaced receptacles formed by the interior extensions 611, 613 and 615 along the inside of locking ring 600. The methods further include moving the locking element relative to remaining portions of the dosimeter badge to release the detachable portion of the dosimeter badge. This preferably accomplished by rotating the locking ring 600 relative to both the stationary badge base 551 and the stationary insert 552.

The novel methods can further be defined to include separating the detachable portion 552 of the dosimeter badge from the remaining portions of the badge. This is advantageously accomplished by engaging the detachable portion, such as by contracting at least one jaw, such as jaws 206, to grasp the detachable dosimeter badge disk. More preferably, the detachable portion is held by contracting a set of movable jaws inwardly to engage the prong teeth 242 with side surfaces of the insert to securely hold the badge in position. The position of the badge on the chuck or tool assembly can be accurately secured by inserting the positioning pins into corresponding receptacles, such as by inserting locating pins 584 into locating receptacles 574.

Novel methods according to this invention can further be defined to include positioning or repositioning the separated or removed portion 552 into a dosimeter reading position adjacent to a stimulating beam and an emission detector. The dosimeters are then stimulated using the stimulating beam and the resulting emission is detected as an indication of the amount of ionizing radiation to which the dosimeter has been exposed. The incorporated by reference U.S. Pat. No. 4,839,518 describes numerous stimulating methodologies which are preferred for use in the dosimeter reading methods according to this invention. The dosimeter badge removable portion is appropriately positioned to read multiple dosimeters if present on the badge. This is done by repositioning the tool head by moving the positioning stages of the X-Y positioner 370 to achieve the desired positions and performing the desired reading methods for each particular dosimeter element. Pre-annealing and post-annealing methods can also be included such as discussed in the incorporated by reference patent indicated above in this paragraph.

Novel methods of this invention also include methods for assembling a detachable dosimeter badge portion with remaining portions of the dosimeter badge. Such assembling can be performed after all reading of the dosimeter badge has been accomplished. Alternatively, such methods can be used upon initial assembly, other assembly or reassembly of these badge parts. In the novel methods of this invention this is advantageously accomplished by positioning or repositioning the detachable portion of the badge into a position adjacent the remaining portions of the badge, and then engaging the detachable portion into engagement with the remaining portions, such as by inserting the disk 552 into the receptacle 653. After the detachable portion of the badge has been inserted or otherwise engaged with the base portion, then the detachable portion is coupled or otherwise secured thereto by attaching the two parts together.

Coupling of the badge parts is advantageously accomplished by engaging the locking element of the badge with locking element activators such as the locking element prongs 614, if such is not already done. The methods further include moving a locking element of the badge into a locking position to engage the locking element with portions of the detachable badge insert. This step is preferably accomplished by rotating the locking ring 600 to cause engagement of the locking ring internal extensions 611-616 with corresponding external extensions 731-736 formed on peripheral portions of the detachable badge insert 552. The moving of the locking element causes the internal extensions to overlie and axially restrain the external extensions of the detachable badge insert.

Methods of this invention can further include removing the assembled dosimeter badge from the reading apparatus, such as by withdrawing the slide assembly 160 to expose the dosimeter badge to manual removal therefrom. The badge is then removed and appropriately handled.

The apparatus according to this invention are constructed by appropriately forming the various components indicated above from suitable materials, such as metals and sythetic polymers, to serve the desired function. The components are fabricated in traditional manners using such materials and assembled into the indicated structures.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A tool for disassembly or assembly of a multiple part radiation dosimeter badge having at least one detachable portion which is controllably releasable from and securable to remaining portions of the dosimeter badge, comprising:
   a first part having a first part face;
   a second part movably connected to the first part, and having a second part face;
   at least one tamper element prong connected to at least one of said parts, which extends from said first part face and said second part face, said at least one tamper element prong comprising means for extending into an aperture in the dosimeter badge to engage at least one tamper resistant element forming a part of said dosimeter badge;
   at least one locking element prong connected to the second part which extends from said second part face, said at least one locking element prong comprising means for extending into an aperture in the dosimeter badge to engage at least one locking element and allowing the locking element to be moved relative to the badge to secure or release a detachable portion of the dosimeter badge from remaining portions of the dosimeter badge when said second part is moved relative to said first part.

2. A tool according to claim 1 wherein the first part is a frame piece and the second part is rotatably mounted on said frame piece.

3. A tool according to claim 1 wherein the first part is a frame piece and the second part comprises a ring rotatably mounted on said frame piece.

4. A tool according to claim 1 wherein there are a plurality of tamper element prongs.

5. A tool according to claim 1 wherein there are a plurality of locking element prongs.

6. A tool according to claim 1 wherein the first part is a frame piece and the second part comprises a ring rotatably mounted on said frame piece, and wherein there are a plurality of locking element prongs and a plurality of tamper element prongs.

7. A tool according to claim 1 wherein said at least one tamper element prong is movably mounted to controllably grasp the detachable portion of the dosimeter badge.

8. A tool according to claim 1 wherein there are a plurality of tamper element prongs which are movably mounted on said first part.

9. A tool according to claim 8 and further comprising a tool positioning mechanism connected to the first part for positioning the tool.

10. A tool according to claim 1 wherein there are a plurality of tamper element prongs which are movably mounted on said first part; at least one of said plurality of tamper element prongs being mounted to controllably contract and expand relative to another tamper element prong.

11. A tool according to claim 1 wherein there are a plurality of tamper element prongs which are movably mounted on said first part; said plurality of tamper element prongs being mounted to controllably contract and expand relative to another tamper element prong; said plurality of tamper element prongs being actuated by movement of said second part.

12. A tool according to claim 1 wherein:
the first part is a frame piece and the second part is rotatably mounted on said frame piece; and
there are a plurality of tamper element prongs which are movably mounted on said first part; said plurality of tamper element prongs being mounted to controllably contract and expand relative to another tamper element prong; said plurality of tamper element prongs being actuated by movement of said second part.

13. A tool according to claim 1 wherein:
the first part is a frame piece and the second part is rotatably mounted on said frame piece;
there are a plurality of tamper element prongs which are movably mounted on said first part; at least one of said plurality of tamper element prongs being mounted to controllably contract and expand relative to another tamper element prong; and
there are a plurality of locking element prongs which are mounted on the second part.

14. A tool according to claim 1 wherein:
the first part is a frame piece and the second part comprises a ring rotatably mounted on said frame piece; and
there are a plurality of tamper element prongs arranged in a circular array which are movably mounted on said first part; at least one of said plurality of tamper element prongs being mounted to controllably contract and expand relative to another tamper element prong.

15. A tool according to claim 14 wherein the ring of the second part mounts camming elements which force the tamper element prongs into contracted positions when the second part is moved relative to said first part.

16. A tool according to claim 1 wherein:
the first part is a frame piece and the second part comprises a ring rotatably mounted on said frame piece;
there are a plurality of tamper element prongs arranged in a circular array which are movably mounted on said first part; and
there are a plurality of locking element prongs which are mounted on the second part in a circular array.

17. A tool according to claim 16 wherein the ring of the second part mounts camming elements which force the tamper element prongs into contracted positions when the second part is moved relative to said first part.

18. A tool according to claim 1 and further comprising a tool positioning mechanism connected to the first part for positioning the tool.

19. A tool according to claim 1 and further comprising a tool positioning mechanism connected to the first part for positioning the tool.

20. A tool according to claim 19 wherein the tool positioning mechanism includes at least one motor means and control means for moving a detachable portion of a dosimeter badge from remaining portions of the dosimeter badge into a reading position and from said reading position back to an installed position with the remaining portions of the dosimeter badge.

21. An apparatus for disassembly and assembly of a multiple part radiation dosimeter badge having at least one detachable portion which is controllably releasable from and securable to remaining portions of the dosimeter badge, comprising:
a dosimeter badge holder for holding a dosimeter badge in a desired operational position;
a first part having a first part face;
a second part movably connected to the first part, and having a second part face;
at least one tamper element prong connected to extend from said first part face and said second part face, said at least one tamper element prong comprising means for extending into an aperture in the dosimeter badge to engage at least one tamper resistant element forming a part of said dosimeter badge;
at least one locking element prong connected to the second part which extends from said second part face, said at least one locking element prong comprising means for extending into an aperture in the dosimeter badge to engage at least one locking element and allowing the locking element to be moved relative to the badge to secure or release a detachable portion of the dosimeter badge from remaining portions of the dosimeter badge when said second part is moved relative to said first part.

22. An apparatus according to claim 21 wherein the first part is a frame piece and the second part is mounted for arcuate motion on said frame piece.

23. An apparatus according to claim 21 wherein the first part is a frame piece and the second part comprises a ring rotatably mounted on said frame piece.

24. An apparatus according to claim 21 wherein there are a plurality of tamper element prongs.

25. An apparatus according to claim 21 wherein there are a plurality of locking element prongs.

26. An apparatus according to claim 21 wherein the first part is a frame piece and the second part comprises a ring rotatably mounted on said frame piece, and wherein there are a plurality of locking element prongs and a plurality of tamper element prongs.

27. An apparatus according to claim 21 wherein said at least one tamper element prong is movably mounted to controllably grasp the detachable portion of the dosimeter badge.

28. An apparatus according to claim 21 wherein there are a plurality of tamper element prongs which are movably mounted on said first part.

29. An apparatus according to claim 28 and further comprising a tool positioning mechanism connected to the first part.

30. An apparatus according to claim 21 wherein there are a plurality of tamper element prongs; at least one of said tamper element prongs being movably mounted on said first part.

31. An apparatus according to claim 21 wherein there are a plurality of tamper element prongs which are movably mounted on said first part.

32. An apparatus according to claim 21 wherein:
the first part is a frame piece and the second part is rotatably mounted on said frame piece; and
there are a plurality of tamper element prongs which are movably mounted on said first part.

33. An apparatus according to claim 21 wherein:

the first part is a frame piece and the second part is rotatably mounted on said frame piece;

there are a plurality of tamper element prongs which are movably mounted on said first part; and there are a plurality of locking element prongs which are mounted on the second part.

34. An apparatus according to claim 21 wherein:

the first part is a frame piece and the second part comprises a ring rotatably mounted on said frame piece; and there are a plurality of tamper element prongs arranged in a circular array which are movably mounted on said first part.

35. An apparatus according to claim 34 wherein the ring of the second part mounts camming elements which force the tamper element prongs into contracted positions when the second part is moved relative to said first part.

36. An apparatus according to claim 21 wherein:

the first part is a frame piece and the second part comprises a ring rotatable mounted on said frame piece;

there are a plurality of tamper element prongs arranged in a circular array which are movably mounted on said first part; and there are a plurality of locking element prongs which are mounted on the second part in a circular array.

37. An apparatus according to claim 36 wherein the ring of the second part mounts camming elements which force the tamper element prongs into contracted positions when the second part is moved relative to said first part.

38. An apparatus according to claim 21 and further comprising a tool positioning mechanism connected to the first part.

39. An apparatus according to claim 21 and further comprising grasping means for grasping a detachable portion of a dosimeter badge.

40. An apparatus according to claim 39 wherein the tool positioning mechanism includes at least one motor means and control means for moving a detachable portion of a dosimeter badge from remaining portions of the dosimeter badge into a reading position and from said reading position back to an installed position with the remaining portions of the dosimeter badge.

41. An apparatus according to claim 21 wherein the dosimeter badge holder includes a sliding member comprising means for holding the dosimeter badge with the detachable portion exposed for removal.

42. An apparatus according to claim 21 wherein the dosimeter badge holder comprising means for holding the dosimeter badge with the detachable portion exposed for removal.

43. A dosimeter badge reading apparatus for disassembling, reading and reassembling a multiple part radiation dosimeter badge having at least one detachable portion which is controllably releasable from and securable to remaining portions of the dosimeter badge, comprising:

a frame;

a dosimeter badge holder for holding the dosimeter badge in a desired operational position;

a movable tool mountint mechanism connected to the frame and having a movable head;

a dosimeter chuck tool mounted on the movable tool mounting mechanism, the dosimeter chuck tool comprising:

a first part having a first part face;

a second part movably connected to the first part, and having a second part face;

at least one tamper element prong connected to at least one of said parts, which extends from said first part face and said second part face, said at least one tamper element prong comprising means for extending into an aperture in the dosimeter badge to engage at least one tamper resistant element forming a part of said dosimeter badge;

at least one locking element prong connected to the second part which extends from said second part face, said at least one locking element prong comprising means for extending into an aperture in the dosimeter badge to engage at least one locking element and allowing the locking element to be moved relative to the badge to secure or release a detachable portion of the dosimeter badge from remaining portions of the dosimeter badge when said second part is moved relative to said first part.

44. A method for releasing a multiple part dosimeter badge having at least one detachable portion which is controllably releasable from and securable to remaining portions of the dosimeter badge using a locking element, the locking element being normally held in a locked position by a tamper-resistant element which resists tampering, comprising:

depressing the tamper-resistant element by extending at least one tamper prong into an aperture formed in the dosimeter badge to displace the tamper-resistant element and release the locking element from the tamper-resistant element;

engaging the locking element by extending at least one locking prong into an aperture formed in the dosimeter badge;

moving the locking element relative to the remaining portions of the dosimeter badge to thereby release the detachable portion.

45. A method according to claim 44 wherein said moving includes rotating the locking element.

46. A method according to claim 44 wherein said depressing is accomplished by a plurality of tamper prongs which depress at spaced positions along a tamper ring.

47. A method according to claim 44 wherein said engaging is accomplished by a plurality of locking prongs which turn a locking ring at spaced positions along a locking ring.

48. A method according to claim 44 wherein the depressing step occurs in an axial direction and said moving occurs in an arcuate movement rotated about said axial direction.

49. A method for removing a detachable portion of a multiple part radiation dosimeter badge from remaining portions of the multiple part dosimeter badge, the detachable portion being controllably releasable from and securable to the remaining portions using a locking element, the locking element being normally held in a locked position by a tamper-resistant element which resists tampering, comprising:

depressing the tamper-resistant element by extending at least one tamper prong into an aperture formed in the dosimeter badge to displace the tamper-resistant element and release the locking element from the tamper-resistant element;

engaging the locking element by inserting at least one locking prong into an aperture formed in the dosimeter badge;

moving the locking element relative to the remaining portions of the dosimeter badge to thereby release the detachable portion;

removing the detachable portion from the remaining portions of the dosimeter badge.

50. A method according to claim 49 wherein said moving includes rotating the locking element.

51. A method according to claim 49 wherein said depressing is accomplished by a plurality of tamper prongs which depress at spaced positions along a tamper ring.

52. A method according to claim 49 wherein said engaging is accomplished by a plurality of locking prongs which turn a locking ring at spaced positions along a locking ring.

53. A method according to claim 49 wherein said removing comprises contracting a plurality of tamper prongs inwardly to grasp the detachable portion.

54. A process for opening a tamper-resistant dosimeter badge, comprising:

inserting at least one tool into tamper element apertures formed in the dosimeter badge;

depressing at least one tamper-resistant element using said tool to remove the tamper-resistant element from engagement with a ring locking element of the dosimeter badge;

rotating said ring locking element to release at least one portion of the dosimeter badge and allow removal thereof.

55. A method for reading at least one dosimeter mounted on a detachable dosimeter disk portion of a multiple part dosimeter badge which is controllably releasable from and securable to remaining portions of the dosimeter badge using a rotatable locking ring, comprising:

engaging the locking ring with at least one locking prong which extends into at least one aperture formed in the dosimeter badge;

rotating the locking ring with the at least one locking prong to release the detachable dosimeter disk portion from remaining portions of the dosimeter badge;

separating the dosimeter disk portion from said remaining portions;

positioning an interior face of the dosimeter disk portion for exposure to a phosphor stimulator for stimulating and reading the at least one dosimeter;

stimulating at least one dosimeter mounted on the interior face of the dosimeter disk portion;

repositioning the dosimeter disk portion with said remaining portions of the dosimeter badge so as to allow securement of the detachable dosimeter disk portion with the remaining portions;

rotating the locking ring to secure the detachable dosimeter disk portion with said remaining portions of the dosimeter badge.

* * * * *